United States Patent
Bratton et al.

(10) Patent No.: US 10,155,228 B1
(45) Date of Patent: Dec. 18, 2018

(54) PLENUM FOR AIR PURIFICATION SYSTEM

(71) Applicant: CRS Industries, Inc., Concord, NC (US)

(72) Inventors: Eric Bratton, Concord, NC (US); Eric Streed, Atlanta, GA (US); Hugh Bradley, Irmo, SC (US)

(73) Assignee: CRS Industries, Inc, Concord, NC (US)

( * ) Notice: Subject to any disclaimer, the term of this patent is extended or adjusted under 35 U.S.C. 154(b) by 387 days.

(21) Appl. No.: 15/178,533

(22) Filed: Jun. 9, 2016

Related U.S. Application Data

(63) Continuation-in-part of application No. 14/637,264, filed on Mar. 3, 2015.

(60) Provisional application No. 62/053,129, filed on Sep. 20, 2014, provisional application No. 61/947,986, filed on Mar. 4, 2014.

(51) Int. Cl.
B01D 53/02 (2006.01)
B03C 3/017 (2006.01)
B03C 3/155 (2006.01)
B03C 3/82 (2006.01)

(52) U.S. Cl.
CPC ............ B03C 3/0175 (2013.01); B03C 3/155 (2013.01); B03C 3/82 (2013.01)

(58) Field of Classification Search
CPC .................................. B03C 3/0175; B03C 3/82
See application file for complete search history.

(56) References Cited

U.S. PATENT DOCUMENTS

| | | | | | |
|---|---|---|---|---|---|
| 3,370,646 | A | * | 2/1968 | Hopper | F28F 19/004 165/95 |
| 3,816,980 | A | * | 6/1974 | Schwab | B03C 3/0175 96/54 |
| 5,330,559 | A | * | 7/1994 | Cheney | B03C 3/155 95/63 |
| 5,474,599 | A | * | 12/1995 | Cheney | B03C 3/155 95/63 |
| 5,690,720 | A | * | 11/1997 | Spero | B03C 3/155 96/26 |
| 6,059,852 | A | * | 5/2000 | Olson | B01D 46/0005 55/481 |
| 2006/0185511 | A1 | * | 8/2006 | Tepper | B03C 3/16 95/71 |
| 2007/0029477 | A1 | * | 2/2007 | Miller | G01N 27/624 250/290 |

(Continued)

Primary Examiner — Christopher P Jones
(74) Attorney, Agent, or Firm — Frijouf, Rust & Pyle P.A.

(57) ABSTRACT

An improved ceiling mounted air treatment system is disclosed for installation upon a ceiling grid system having a plurality of ceiling panels within a room. The improved ceiling mounted air treatment system comprises a ceiling plenum defining a plurality of side walls, a top wall and a bottom wall. The plurality of side walls are dimensioned for replacing a ceiling panel of the ceiling grid system. An air input and an air output are defined in the bottom wall. A grid array is disposed within the plenum and located between the air input and the air output. An electronic generator is connected to the grid array for treating the flow of air through the grid array. A fan is interposed between the air input and the air output for establishing the flow of air from the room into the air input to exit from the air output into the room.

19 Claims, 30 Drawing Sheets

(56) References Cited

U.S. PATENT DOCUMENTS

2009/0025402 A1* 1/2009 Mello ........................ B03C 3/09
                                                            62/78

\* cited by examiner

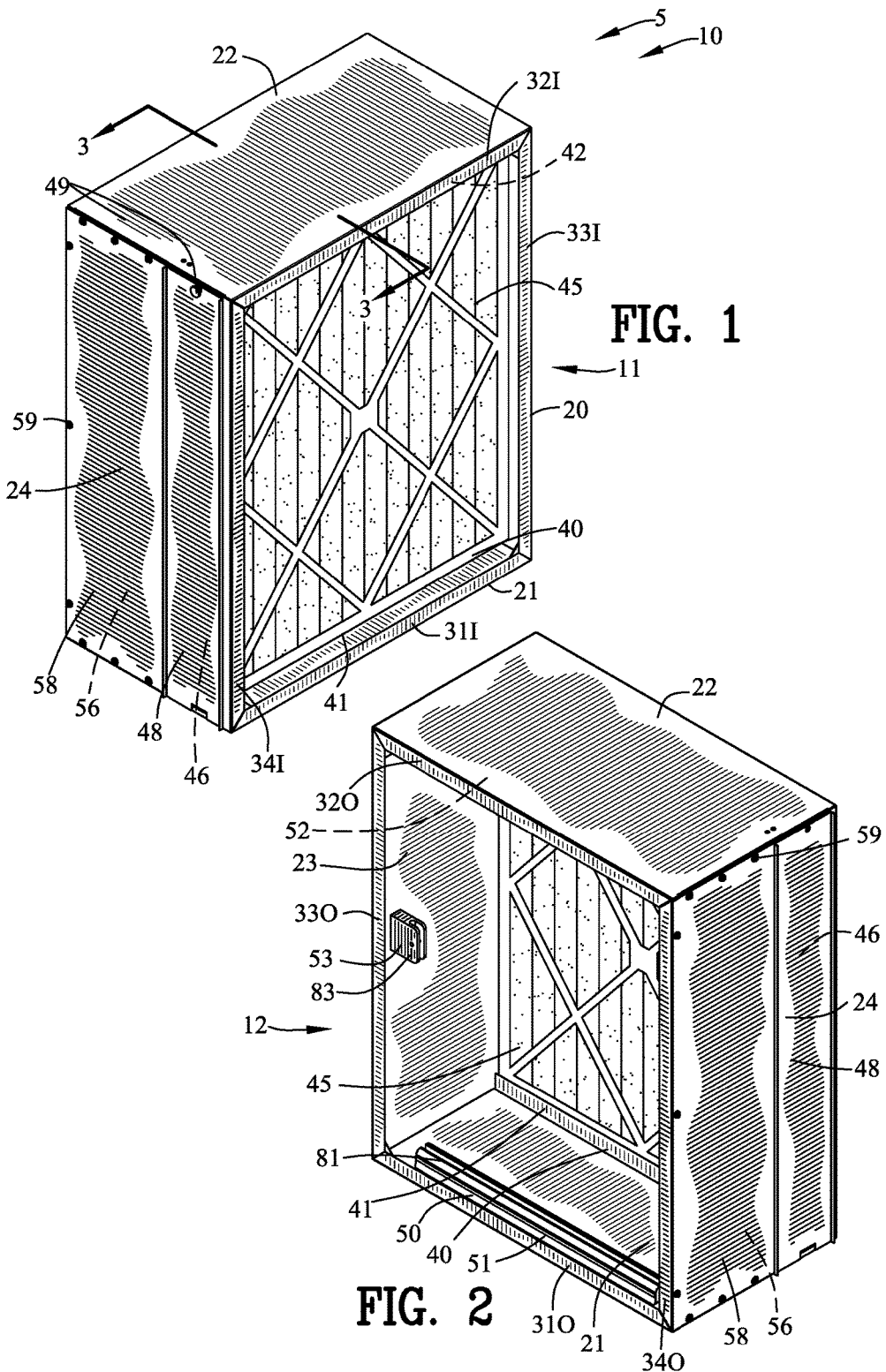

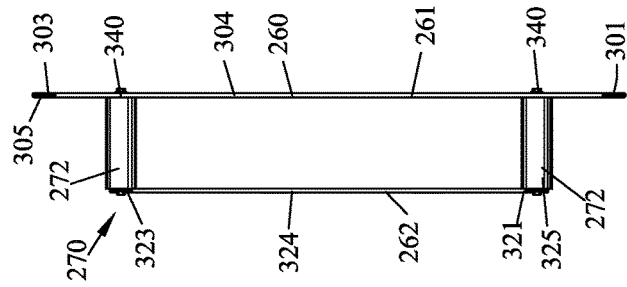
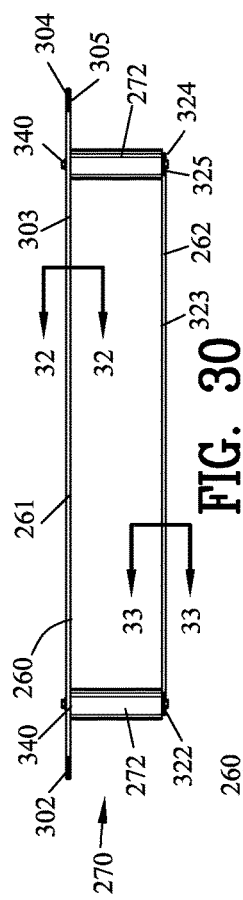
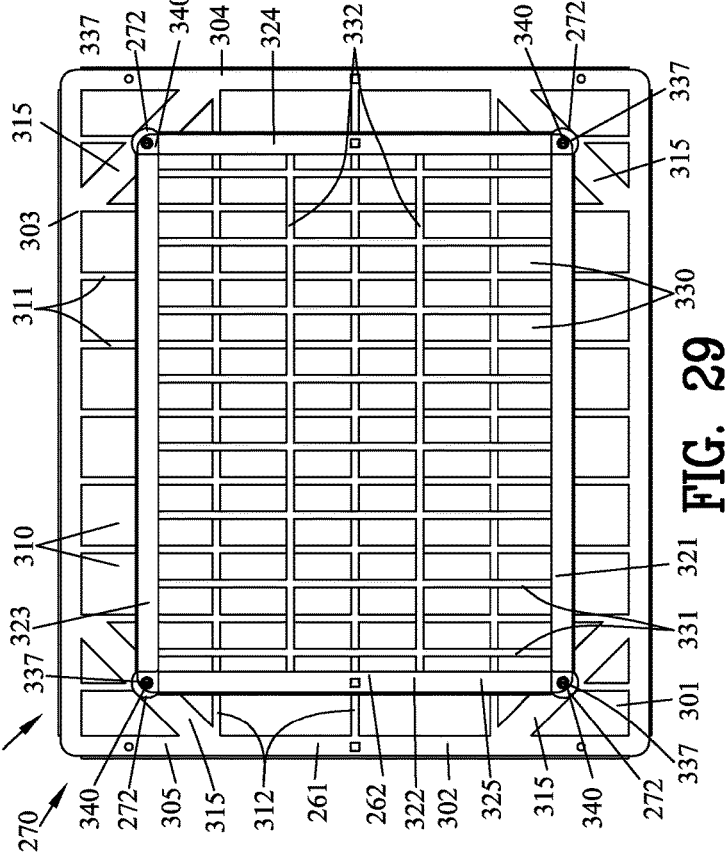

PLENUM FOR AIR PURIFICATION SYSTEM

CROSS-REFERENCE TO RELATED APPLICATIONS

This application is a continuation-in-part of application Ser. No. 14/637,264 filed Mar. 3, 2015. application Ser. No. 14/637,264 filed Mar. 3, 2015 claims benefit of U.S. Patent Provisional application No. 61/947,986 filed Mar. 4, 2014 and U.S. Patent Provisional application No. 62/053,129 filed Sep. 20, 2014. All subject matter set forth in application Ser. No. 14/637,264 filed Mar. 3, 2015 and provisional application No. 61/947,986 filed Mar. 4, 2014 and provisional application No. 62/053,129 filed Sep. 20, 2014 is hereby incorporated by reference into the present application as if fully set forth herein.

BACKGROUND OF THE INVENTION

Field of the Invention

The invention relates to air purification and more particularly to an improved ceiling mounted air treatment system for installation upon a ceiling grid system.

Description of the Related Art

Air quality and air purification have been concerns since the early 1800s. Through the years, scientists continued to develop more sophisticated and effective systems to achieve cleaner air. Today, commercial air purification systems which may be installed as stand alone units or incorporated into an air handler or HVAC unit are commonly found in medical, commercial and industrial buildings. The elimination of airborne contaminants such as pollen, dust, mold spores and others acting as allergens are readily eliminated by today's air purification systems. However, many conventional air filtration systems are unable to capture particles in the micron and sub micron range. Enhanced particle removal has been achieved using purification systems which subject airborne contaminants to complex electrical fields.

Air purification systems reduce energy costs by air recirculation, thereby reducing the need for large amounts of outside air. Recirculated air remains close to the desired interior space temperature, therefore additional heating or cooling of the air passing through the HVAC system is reduced.

Although the development of air purification systems has been primarily directed to units installed in commercial buildings and the like, there remains the need for high efficiency air purification systems for residential applications.

There have been many in the prior art who have attempted to solve these problems with varying degrees of success. None, however completely satisfies the requirements for a complete solution to the aforestated problem. The following U. S. Patents are attempts of the prior art to solve this problem.

U.S. Pat. No. 3,862,826 to Haupt discloses a filter system for removing pollutant particles suspended in a fluid body. The system comprising a precharging means to electrically precharge the suspended particles, and a precipitator means to attract and collect the charged particles. A fluid turbulator means disposed between the precharging means and precipitator means alters the fluid flow to enhance the collection of the charged particles and neutralizing means neutralizes the fluid flow before exiting the filter system.

U.S. Pat. No. 3,892,544 to Haupt discloses an electrodynamic electrostatic gas charge system to separate combined particles of dissimilar substances and recombination into combined particles of similar substance. The system comprises an antenna array including a first and second electrode means disposed across the gas flow and a signal generator means. The signal generator means includes a first and second signal output generator means coupled to the first and second electrode means respectively to generate charged force fields to separate dissimilar substances and recombine like particles.

U.S. Pat. No. 3,977,848 to Oliphant discloses an electrodynamic gas charge system comprising at least one electrically charged element and screen element arranged relative to each other to form a voltage gradient therebetween. The system includes means to vary the voltage gradient between the electrically charged element and screen element. The elements are disposed across a gas flow such that particles of dissimilar substances are separated by the charged force field and recombined with like particles.

U.S. Pat. No. 4,019,367 to Norsworthy discloses an improved method and apparatus for the detection and measurement of concentrations of foreign substances in a fluid, particularly atmospheric gas. Transducers and signal modifying devices are electronically connected in a predetermined arrangement so as to determine the concentration of foreign matter and display this concentration as a linear function determined by the amount of foreign matter found.

U.S. Pat. No. 5,061,296 to Sengpiel, et al. discloses an air purification system for subjecting air to a complex electrical field including sensors and a monitor/controller for monitoring effectiveness, operational conditions of the electrical field and the system, and ambient conditions of the air being purified. The level of the high voltage, RMS and high frequency is processed so that frequency, RMS and high D.C. can be measured at a low D.C. voltage.

U.S. Pat. No. 5,401,299 to Kroeger, et al. discloses an air purification system where air is subjected to complex electrical field resulting from a DC voltage and AC frequency in kilovolt and kilohertz range respectively, applied to screen assembly in air path. DC amplitude and AC frequency self regulate to selected parameters. Parameters are selectable independently of one another.

U.S. Pat. No. 5,542,964 to Kroeger, et al. discloses an air purification system where air is subjected to complex electrical field resulting from a DC voltage and AC frequency in kilovolt and kilohertz range respectively, applied to screen assembly in air path. DC amplitude and AC frequency self regulate to selected parameters. Parameters are selectable independently of one another.

In our prior invention set forth in the patent application Ser. No. 14/637,264 filed Mar. 3, 2015, we disclosed an improved apparatus for air purification to the art.

It is an object of the present invention to improve upon our prior invention and provide an improved ceiling mounted air treatment system for installation upon a ceiling grid system.

Another object of this invention is to provide an improved apparatus for air purification in an environment which is readily retrofitted to an existing ceiling grid systems.

Another object of this invention is to provide an improved apparatus that is simple to install by an installer with limited skills.

Another object of this invention is to provide an improved apparatus that is simple for the operator to use.

Another object of this invention is to provide an improved apparatus that is easy to cost effectively produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved ceiling mounted air treatment system for installation upon a ceiling grid system having a plurality of ceiling panels within a room. The improved ceiling mounted air treatment system comprises a ceiling plenum defining a plurality of side walls, a top wall and a bottom wall. The plurality of side walls is dimensioned for replacing a ceiling panel of the ceiling grid system. An air input and an air output is defined in the bottom wall. A grid array is disposed within the plenum and located between the air input and the air output. An electronic generator is connected to the grid array for treating the flow of air through the grid array. A fan is interposed between the air input and the air output for establishing the flow of air from the room into the air input to exit from the air output into the room.

In one embodiment, an air filter seat is located in the ceiling plenum adjacent to the air input. An input grill is removably mounted to the ceiling plenum adjacent to the air input for introducing and removing an air filter into the ceiling plenum.

In another embodiment, a grid array aperture is defined in a side wall of the ceiling plenum adjacent to the grid array track. A grid array closure is secured to the grid array for removably covering the grid array aperture when the grid array is slideably inserted into the grid track of the ceiling plenum. The electronic generator is mounted to an outer surface of the grid closure and connected to the grid array for generating electric fields for agglomerating particles within air passing from the air input to the air output. Preferably, the grid array comprises a first and a second grid. A first insulator for insulates the first grid from the ceiling plenum. A second insulator insulates the second grid relative from the first grid.

In still another embodiment, a baffle is disposed within the plenum for isolating the air input from the air output. A baffle orifice is defined in the baffle. The fan is located in the baffle orifice for directing air flow from the fan from the electronic generator and grid array to exit the air output.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 1 is an isometric view illustrating an input of a first embodiment of the air plenum of the present invention;

FIG. 2 is an isometric view illustrating an output of the air plenum of FIG. 1;

FIG. 29 is a front view of the improved grid array of FIG. 27;

FIG. 30 is a top view of the improved grid array of FIG. 29;

FIG. 31 is an end view of the improved grid array of FIG. 29;

Similar reference characters refer to similar parts throughout the several Figures of the drawings.

DETAILED DISCUSSION

Figure 3:
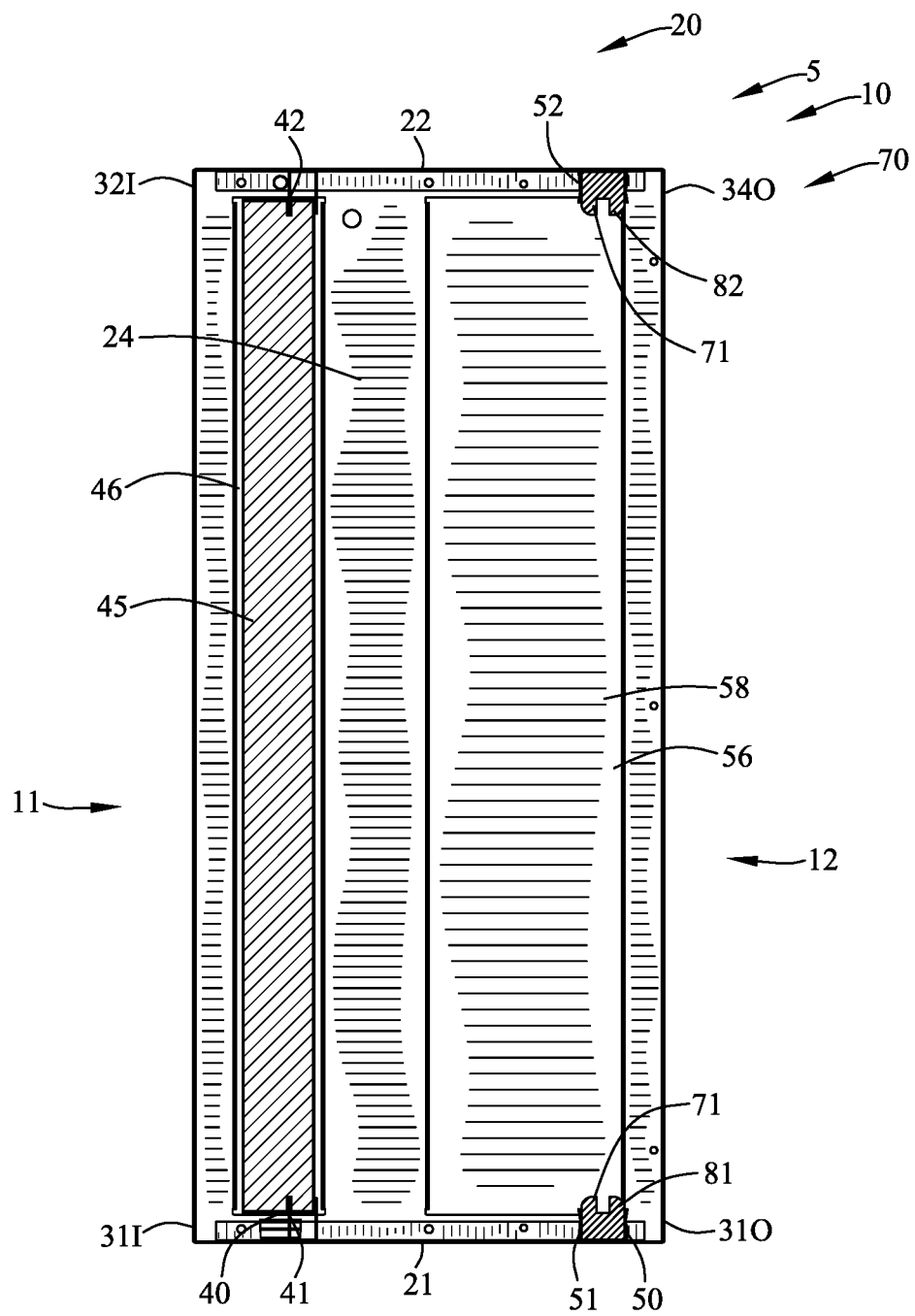
FIG. 3 is a sectional view along a line 3-3 in FIG. 1.
Figure 4:
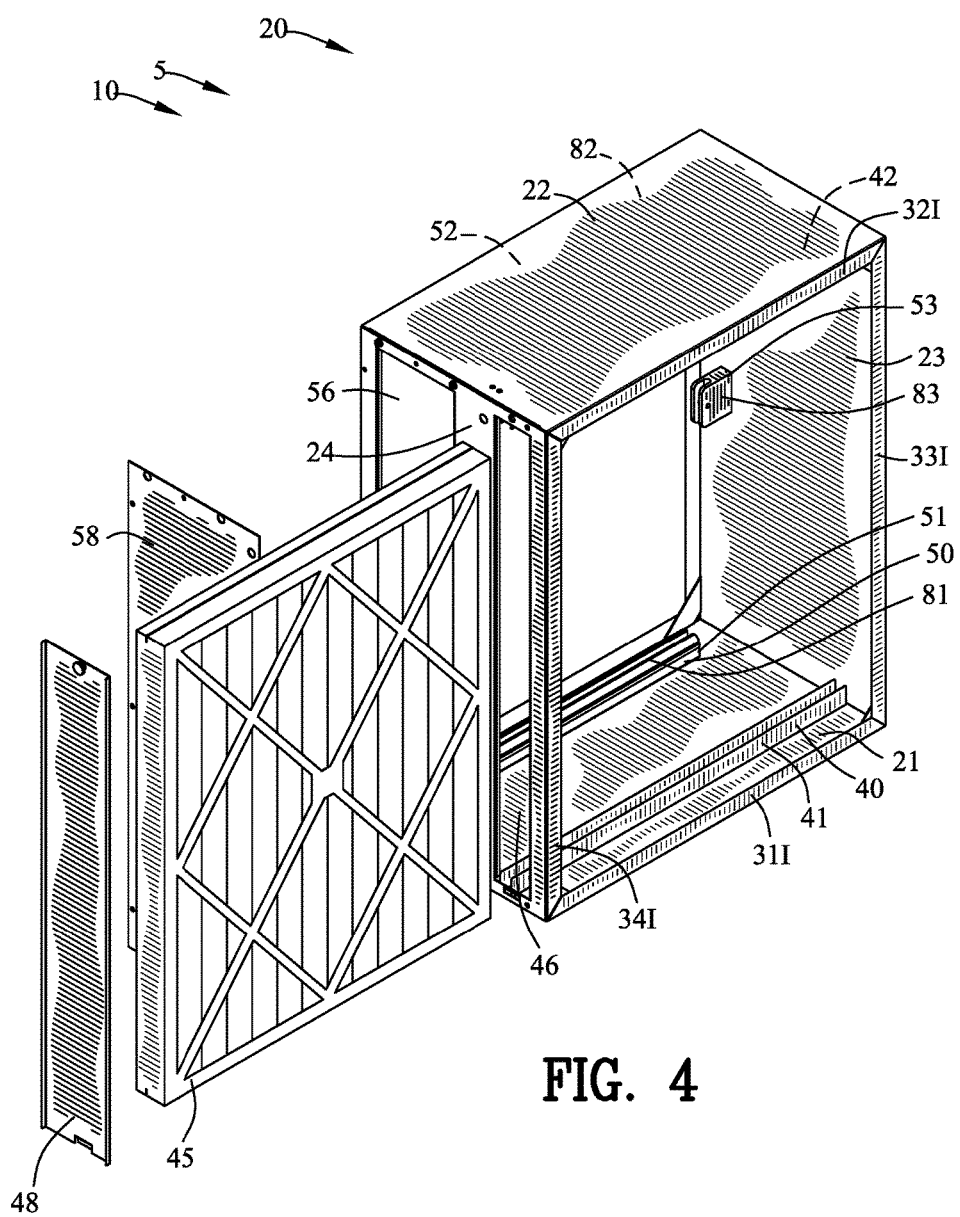
FIG. 4 is an exploded view of FIG. 1.

FIGS. 1-4 are various views illustrating a first embodiment of the air purification system 5 of the present invention. The air purification system 5 is adapted for use with a conventional air conditioning heating system (not shown).

The air purification system 5 comprises a plenum 10 for connection to the input of the conventional air conditioning heating system (not shown). The plenum 10 comprises a frame 20 having peripheral walls 21-24 with input wall supports 311-341 and output wall supports 310-340 for strengthening the frame 20.

Peripheral walls 21-24 close the periphery of the fame 20 defining an air input 11 and an air output 12 to the plenum 10. The plenum 10 is connected to the conventional air conditioning heating system (not shown) such that incoming air enters the air input 11 and exits the air output 12 of the plenum 10 to enter into an input of the conventional air conditioning heating system (not shown).

An air filter track 40 is secured relative to the frame 20 for positioning an air filer between the air input 11 and the air output 12 of the plenum 10. Preferably, the air filter track 40 comprises a first and a second air filter track 41 and 42 secured to opposite peripheral walls 21 and 22. The first and a second air filter track 41 and 42 are adapted to slidably receive a conventional air filter 45.

An air filter aperture 46 is defined in a selected peripheral wall 24 adjacent to the air filter track 40. An air filter aperture closure 48 is removably secured to the selected peripheral wall 24 for covering the filter aperture 46. Conventional mechanical fasteners 49 are provided for removably securing the air filter aperture closure 48 to the selected peripheral wall 24. The air filter aperture closure 48 enables the air filter 45 to be introduced and removed from the air filter track 40.

A grid track 50 is secured relative to the frame 40 downstream from the air filter track 40. Preferably, the grid track 50 comprises a first and a second grid track 51 and 52 secured to the opposite peripheral walls 21 and 22. A third grid track 53 is secured to the peripheral walls 23.

The selected peripheral wall 24 defines a grid aperture 56 defined in the selected peripheral wall 24 adjacent to the grid track 50. A grid aperture closure 58 is removably secured to the selected peripheral wall 24 for covering the grid aperture 56. Conventional mechanical fasteners 59 are provided for removably securing the grid aperture closure 58 to the selected peripheral wall 24.

The plenum 10 of the present invention is designed to cooperate with a conventional air conditioning/heating unit (not shown) for mounting a conventional air filter 45. The plenum 10 may be coupled to the air conditioning/heating unit (not shown) as an accessory unit or may be incorporated into the air conditioning/heating unit (not shown) as an original part of the air conditioning/heating unit (not shown) by an original equipment manufacturer.

The present invention enables the plenum 10 to be upgraded into an air purification system 5. The inclusion of the grid array track 50 and the grid aperture 56 enable a grid array 60 and an electronic generator 90 to be added to the plenum 10 to upgrade the plenum 10 into air purification system 5. The grid array 60 and the electronic generator 90 may be added to the plenum 10 to upgrade the plenum 10 into air purification system 5 at the time of installation of the plenum 10 or at a later time.

Figure 5:
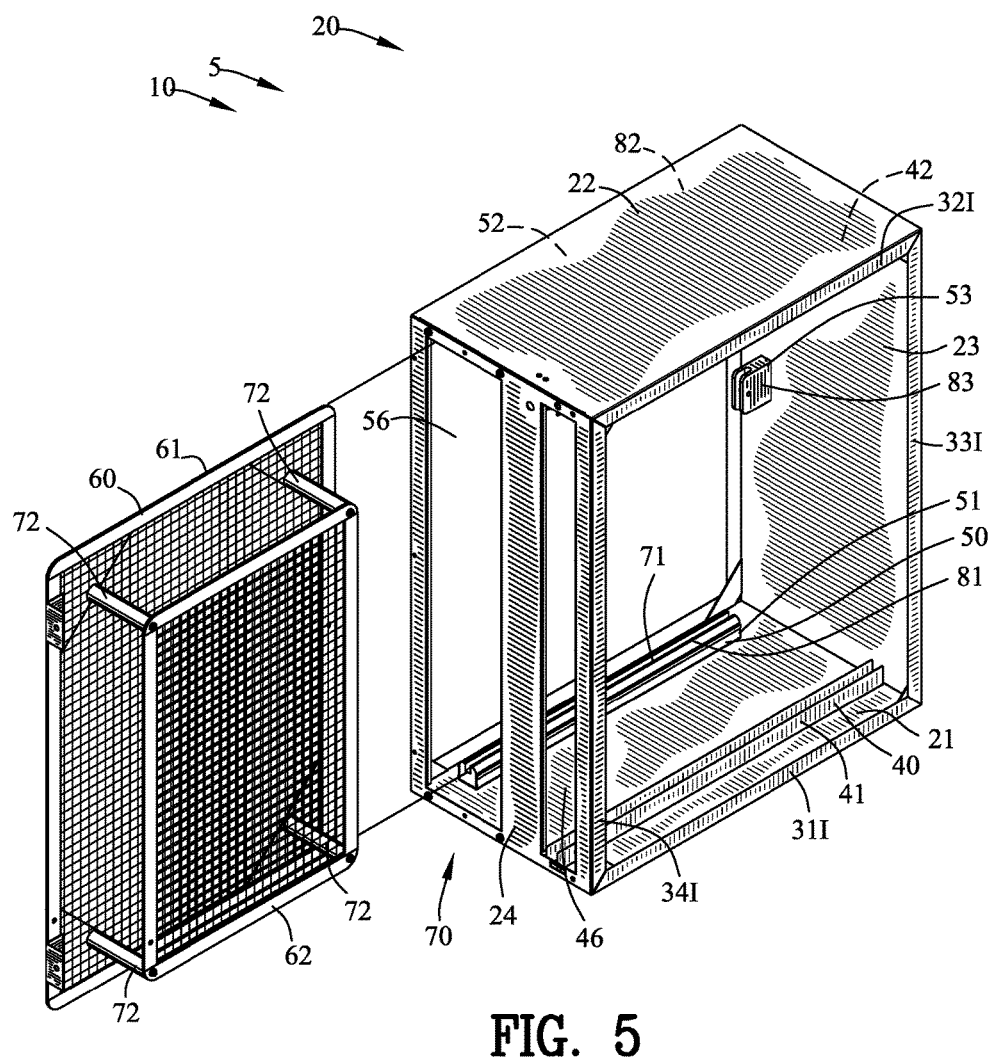
FIG. 5 is an isometric view illustrating the insertion of a grid array into a frame of the plenum of FIGS. 1-4 for creating an air purification system of FIGS. 1-4.

FIG. 5 is an isometric view illustrating the insertion of the grid array 60 into a frame 20 of the air purification system 5 of FIGS. 1-4. The grid array 60 is inserted through the grid aperture 56 into the grid track 50. The grid array 60 comprises a first and a second grid 61 and 62. Insulators 72 insulate the first and second grids 61 and 62 from each other and insulate the grid array 60 from the frame 20. A first insulator 71 insulates the first grid 61 of the grid array 60 from the frame 20. The second insulator 72 insulates the second grid 62 from the first grid 61.

The first insulator 71 comprises insulators 81-83 for insulating the first grid 61 from the peripheral walls 21-23. The insulators 81-83 are interposed between the first grid 61 and the first through third grid tracks 51-53. Insulators 85 and 86 insulate the first grid 61 from the peripheral wall 24.

The second insulator comprising a plurality of insulators 72 spaces the second grid 62 relative to the first grid 61. The first grid 61 is dimensionally larger than the second grid 62 for spacing the second grid 62 from the peripheral sidewalls 21-24 of the frame 20.

Figure 6:
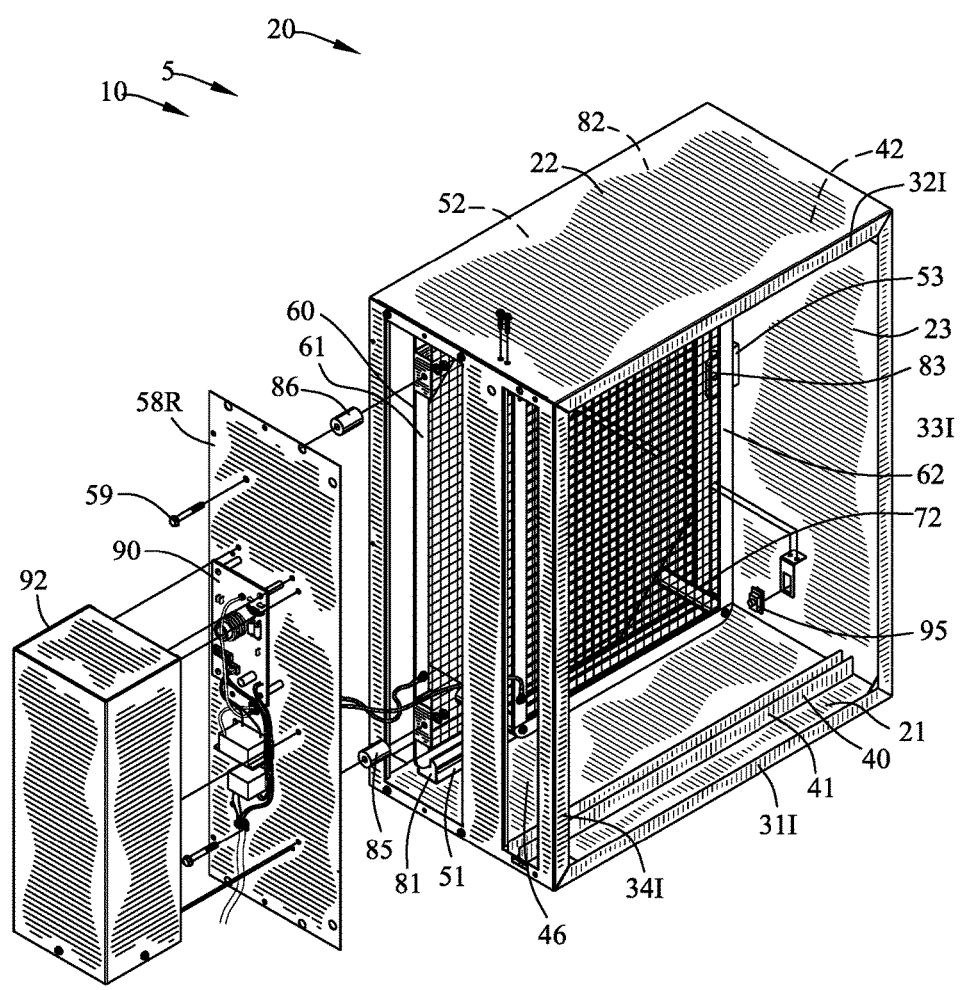
FIG. 6 illustrates the installation of a grid aperture closure containing an electronic grid generator for the grid array.

FIG. 6 is an isometric view illustrating the mounting of a replacement grid closure 58R to the frame 20 for closing the grid aperture 56. The replacement grid closure 58R may be secured to the frame 20 by reusing the conventional mechanical fasteners 59.

An electronic generator 90 is mounted to an outer surface of the replacement grid closure 58R. The electronic generator 90 is connected to the first and second grids 61 and 62 of the grid array 60.

Figure 7:
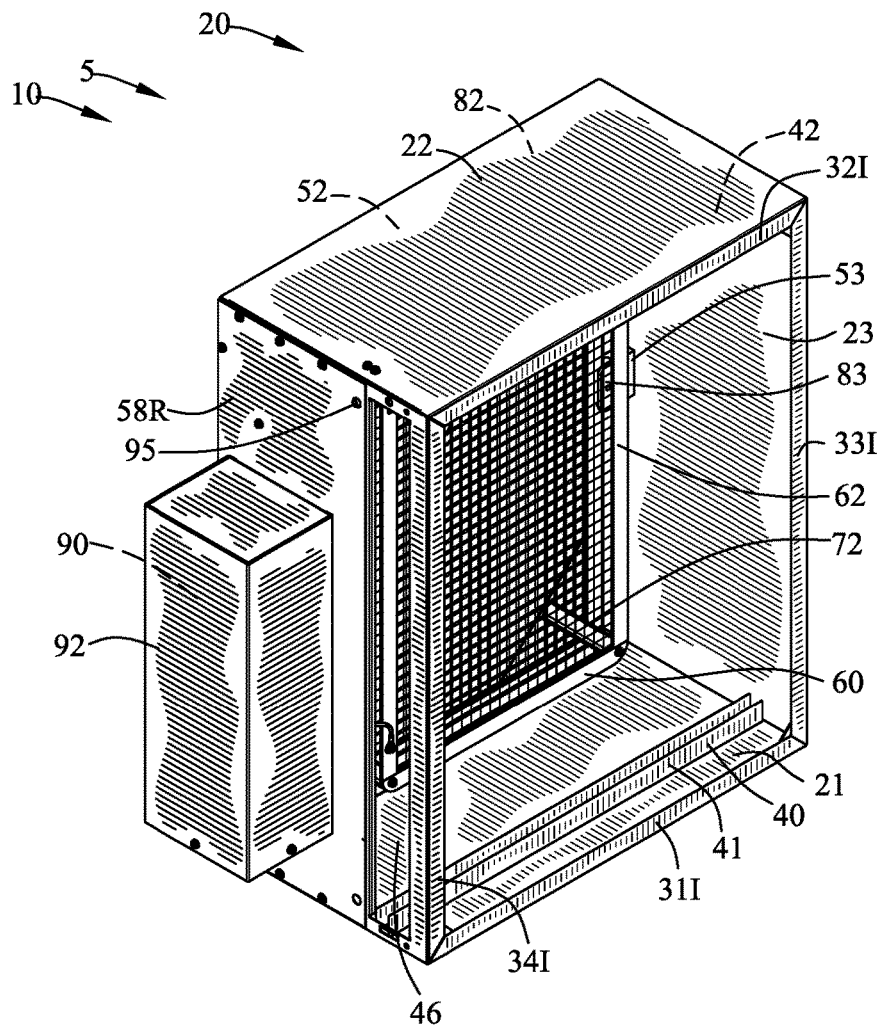
FIG. 7 illustrates the complete installation of the grid aperture closure containing the electronic grid generator.
Figure 8:
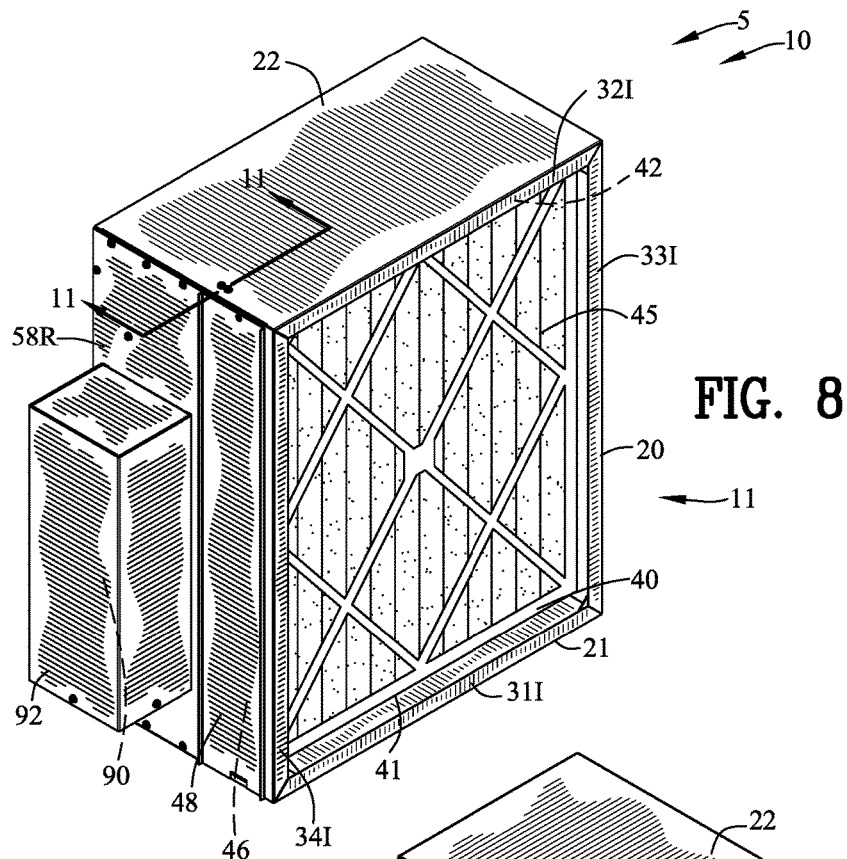
FIG. 8 is an isometric view similar to FIG. 1 illustrating the air purification system incorporating electronic grid generator and the grid array.
Figure 9:
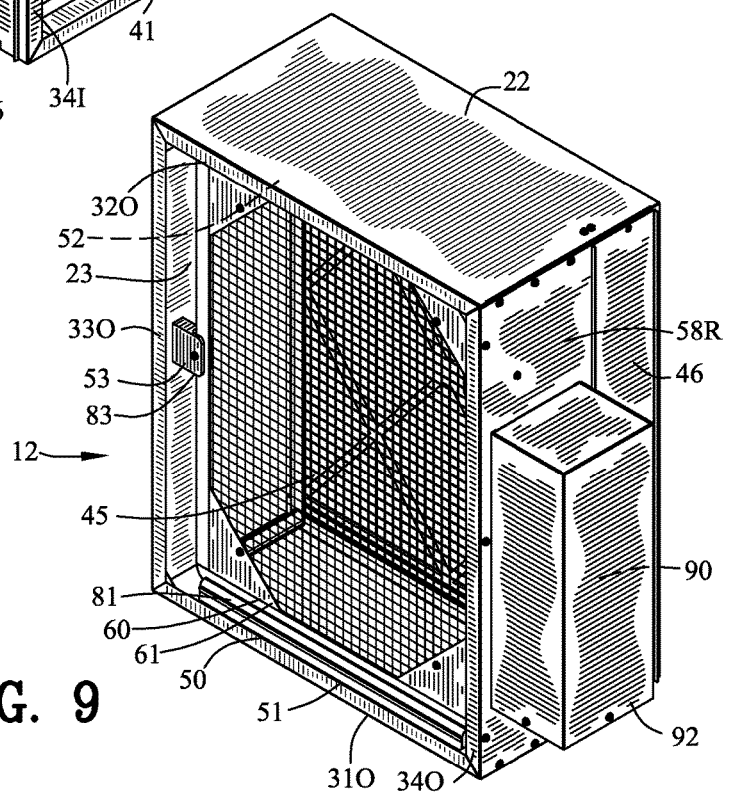
FIG. 9 is an isometric view similar to FIG. 2 illustrating the air purification system incorporating electronic grid generator and the grid array.

FIGS. 7-9 are isometric view illustrating a generator cover 92 secured to the replacement grid closure 58R for enclosing the electronic generator 90. The electronic generator 90 generates electric fields for the first and second grids 61 and 62 for agglomerating particles within air passing from the air input 11 to the air output 12 of the plenum 10. A more through explanation of the electronic generator 90 may be found in U.S. Pat. No. 5,542,964 to Kroeger, et al. which is incorporated by reference as if fully set forth herein.

Figure 10:
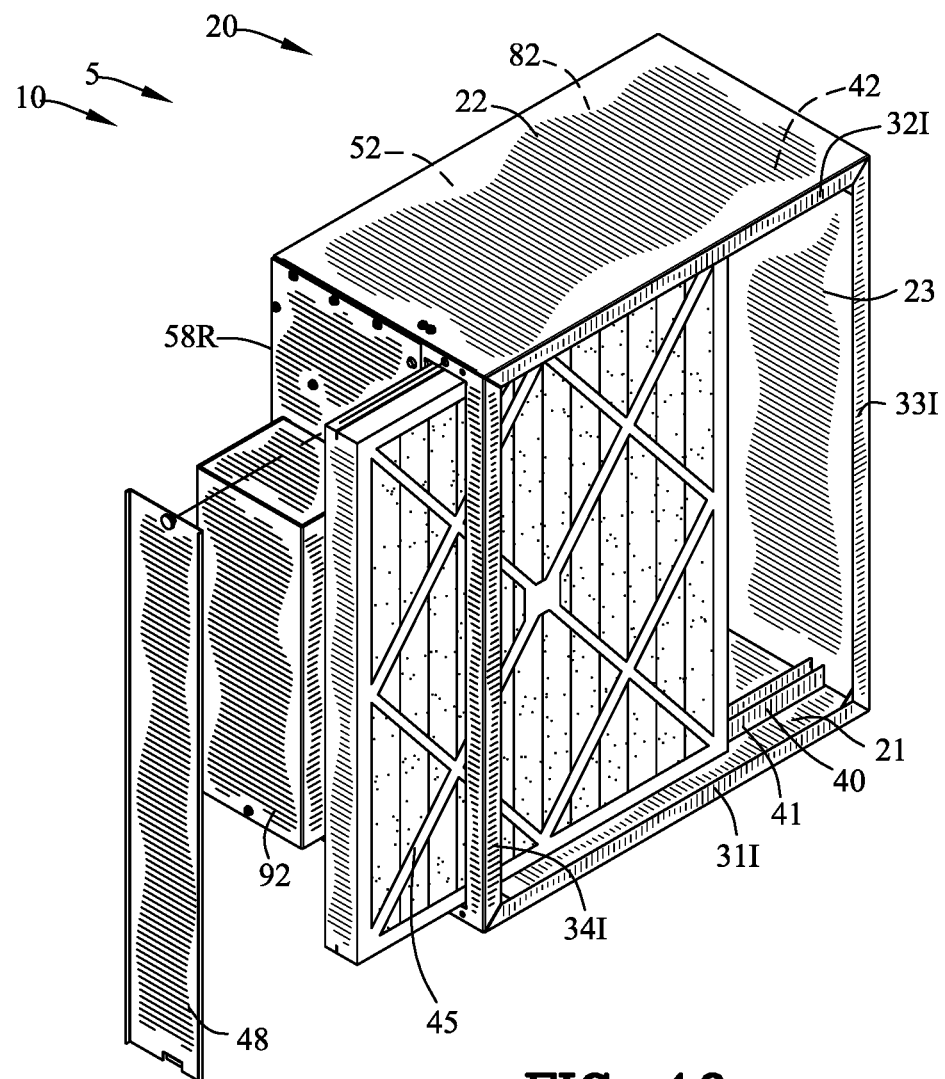
FIG. 10 illustrates the removal of an air filter from the frame of the air purification system of FIG. 8.
Figure 11:
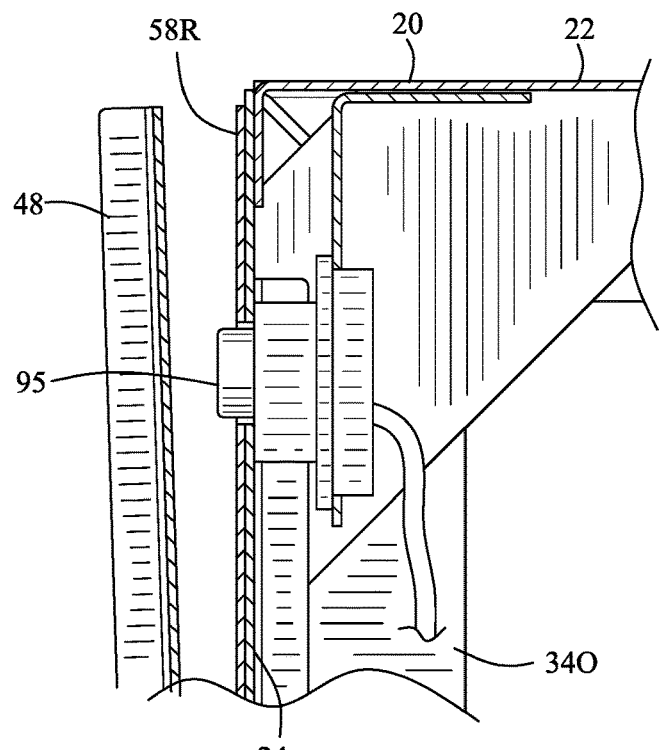
FIG. 11 is a sectional view along a line 11-11 in FIG. 8 illustrating the removal of an air filter aperture closure to open a disconnect switch for terminating operation of the electronic generator.
Figure 12:
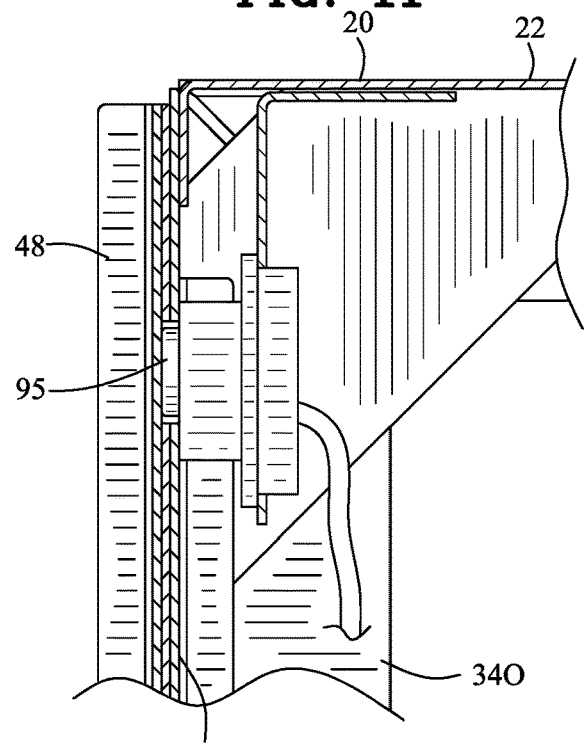
FIG. 12 is a view similar to FIG. 11 illustrating the reinstallation of the air filter aperture closure to close the disconnect switch for reactivating the electronic generator to the grid array.

FIGS. 10-12 illustrate the removal of the air filter aperture closure 48 for removing and replacing the air filter 45. A disconnect switch 95 is mounted in proximity to the air filter aperture closure 48. The disconnect switch 95 is connected to the electronic generator 90 for providing a safety interlock for the high voltage applied to the grid array 60.

FIG. 11 illustrates the disconnect switch 95 upon opening of the air filter aperture closure 48. The disconnect switch 95 terminates operation of the electronic generator 90 for de-energizing the grid array 60 upon removal of the filter aperture closure 48.

FIG. 12 illustrate a disconnect switch 95 upon reinstalling the air filter aperture closure 48. The disconnect switch 95 enables operation of the electronic generator 90 for energizing the grid array 60 upon reinstallation of the filter aperture closure 48.

FIGS. 13-23 are similar to FIGS. 1-12 illustrating a second embodiment of the air purification system 105 of the present invention. Similar parts are labeled with similar reference characters raised by 100.

The second embodiment of the present invention enables the plenum 110 to be upgraded into air purification system 105 in a faster and less complicated installation. The second embodiment of the air purification system 105 eliminates the need to interconnect the grid array 160 to the electronic generator 190. In addition, the second embodiment of the air purification system 105 eliminates the need to wire the disconnect switch 195 to the electronic generator 190.

The air purification system 105 comprises a plenum 110 for connection to the input of the conventional air conditioning heating system (not shown). The plenum 110 comprises a frame 120 having peripheral walls 121-124 defining an air input 111 and an air output 112 to the plenum 110.

An air filter track 140 is secured relative to the frame 120 for positioning an air filer between the air input 111 and the air output 112 of the plenum 110. Preferably, the air filter track 140 comprises a first through fourth air filter tracks 141-144 secured to opposite peripheral walls 121-124 for slidably receiving a conventional air filter 145.

A selected peripheral wall 124 defines an air filter aperture 146 defined in a selected peripheral wall 124 adjacent to the air filter track 140. The selected peripheral wall 124 is removable from the frame 120.

Figure 13:
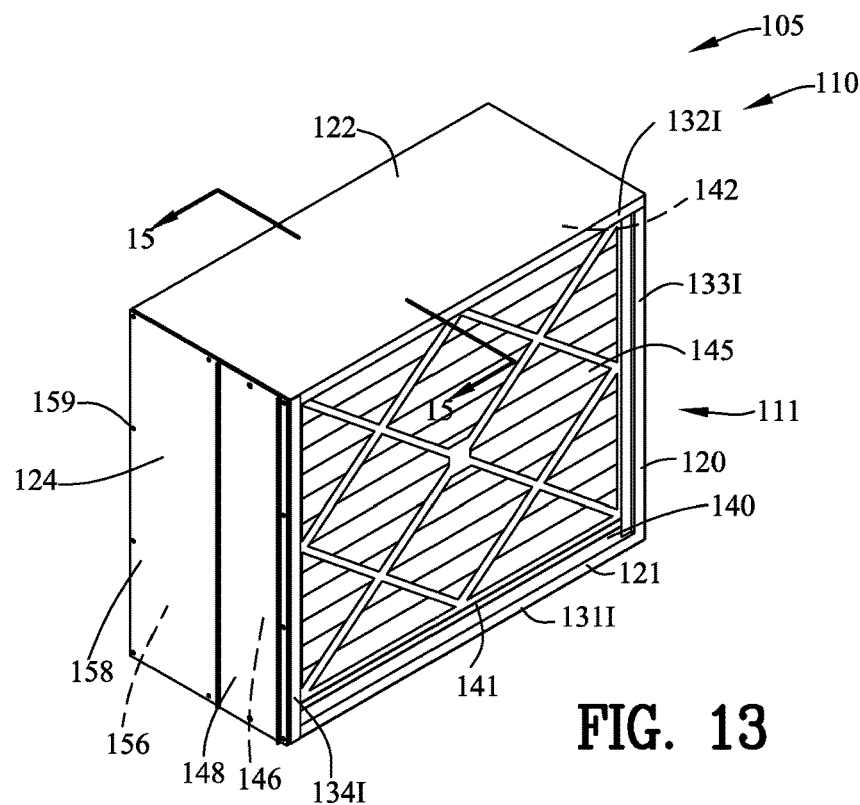
FIG. 13 is an isometric view illustrating an input of a second embodiment of the air plenum of the present invention.
Figure 16:
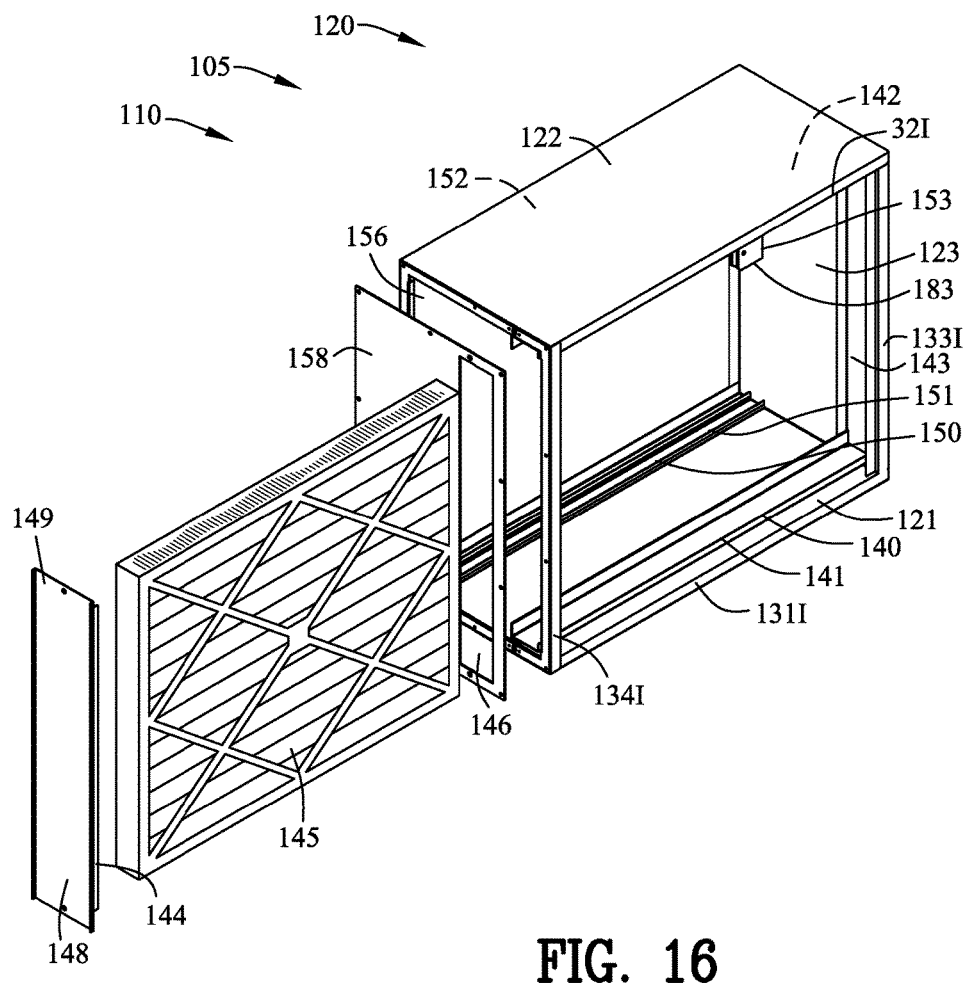
FIG. 16 is an exploded view of FIG. 13.

FIG. 16 is an exploded view of FIG. 13. An air filter aperture closure 148 is removably secured to the selected peripheral wall 124 for covering the filter aperture 146. Conventional mechanical fasteners 149 are provided for removably securing the air filter aperture closure 148 to the selected peripheral wall 124. The air filter aperture closure 148 enables the air filter 145 to be introduced and removed from the air filter track 140.

A grid track 150 is secured relative to the frame 120 downstream from the air filter track 140. Preferably, the grid track 150 comprises a first and a second grid track 151 and 152 secured to the opposite peripheral walls 121 and 122. A third grid track 153 is secured to the peripheral wall 123.

A replacement peripheral wall 158R is dimensioned substantially identically to the selected peripheral wall 124. A replacement air filter aperture 146R is defined in the replacement peripheral wall 158R adjacent to the air filter track 140.

Figure 17:
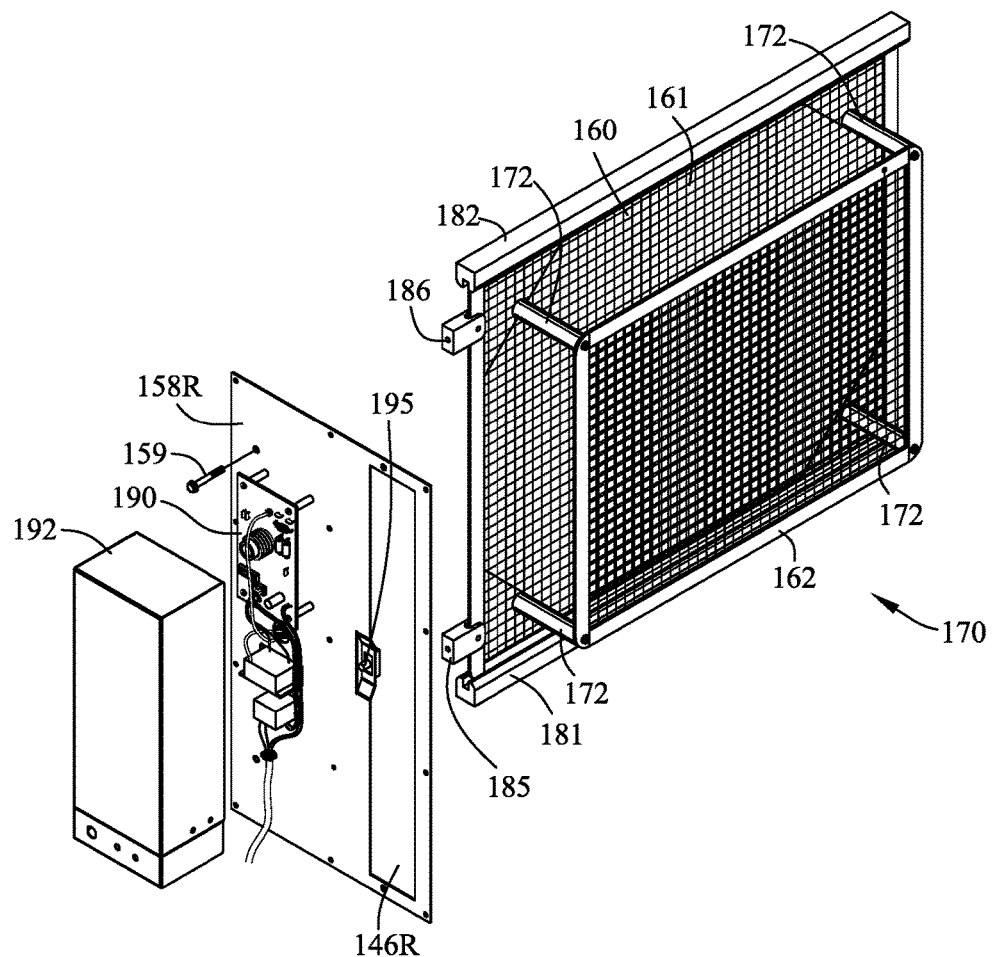
FIG. 17 is an exploded view of an air purifying system of the present invention.

FIG. 17 is an exploded view of an air purifying system 105 of the present invention. A grid array 160 is secured to an inside side surface of the replacement peripheral wall 158R. An electronic generator 190 is mounted to an outer surface of the replacement peripheral wall 158R and connected to the grid array 160.

Insulators 170 insulate the first and second grids 161 and 162 from each other and insulate the grid array 160 from the frame 120. A first insulator 171 insulates the first grid 161 of the grid array 160 from the frame 120 The second insulator 172 insulates the second grid 162 from the first grid 161 The first insulator 171 comprises insulators 181-183 for insulating the first grid 161 from the peripheral walls 121-123. The insulators 18 1and 182 are inserted into the first and second grid track 151-153. The first grid 161 is slidably received within slots in the insulators 181 and 182. Insulators 185 and 186 insulate the first grid 161 from replacement peripheral wall 158R.

Figure 18:
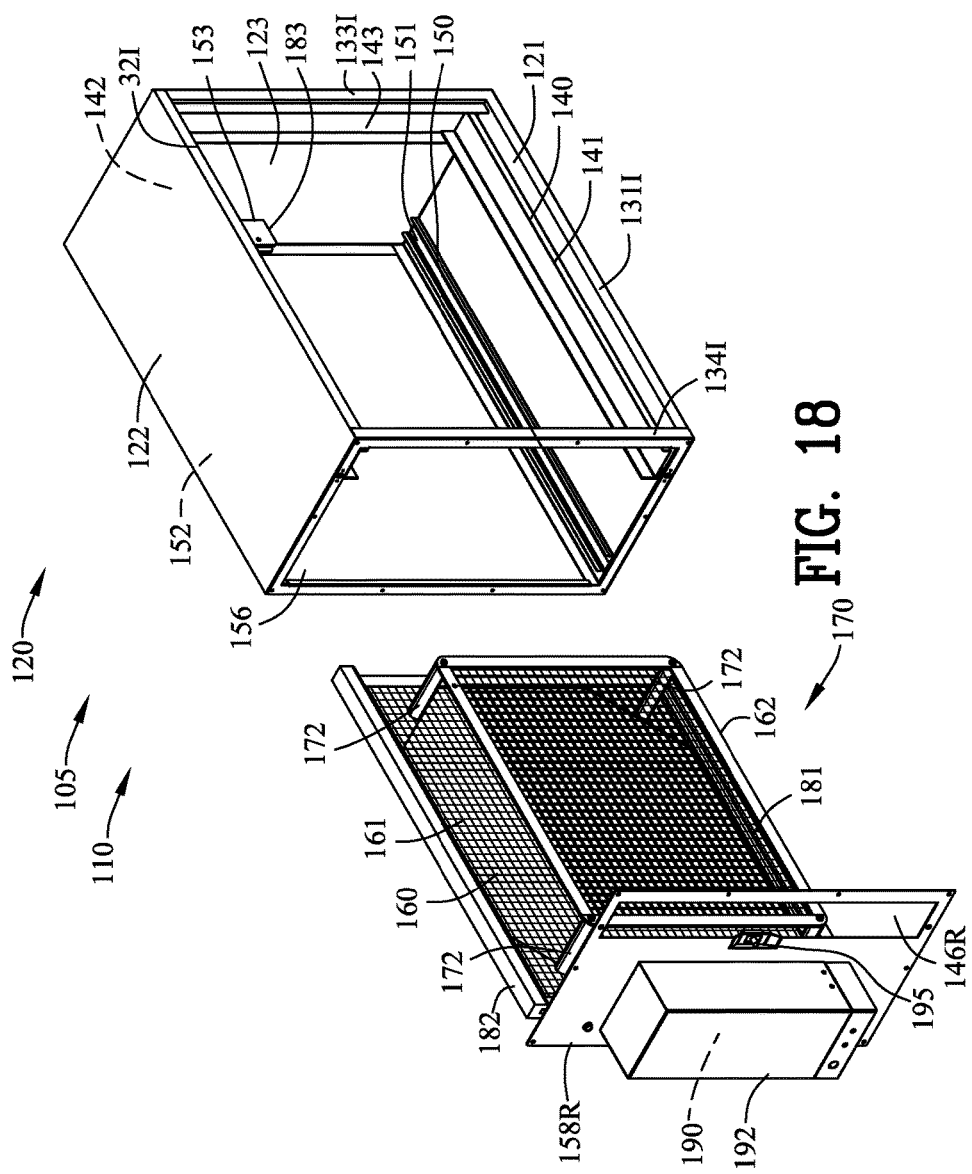
FIG. 18 is an isometric view illustrating the insertion of air purifying system of the present invention into the air plenum of FIGS. 13-16.

FIG. 18 is an isometric view illustrating the insertion of air purifying system 105 of the present invention into the air plenum 110 of FIGS. 13-16. The replacement peripheral wall 158R is inserted into the frame 120 with the grid array 160 received within the grid track 150 and with the electronic generator 190 mounted to an outer surface of the replacement peripheral wall 158R. The electronic generator 190 is pre-wired to the grid array 160. Furthermore, the disconnect switch is pre-wired to the electronic generator 190.

Figure 19:
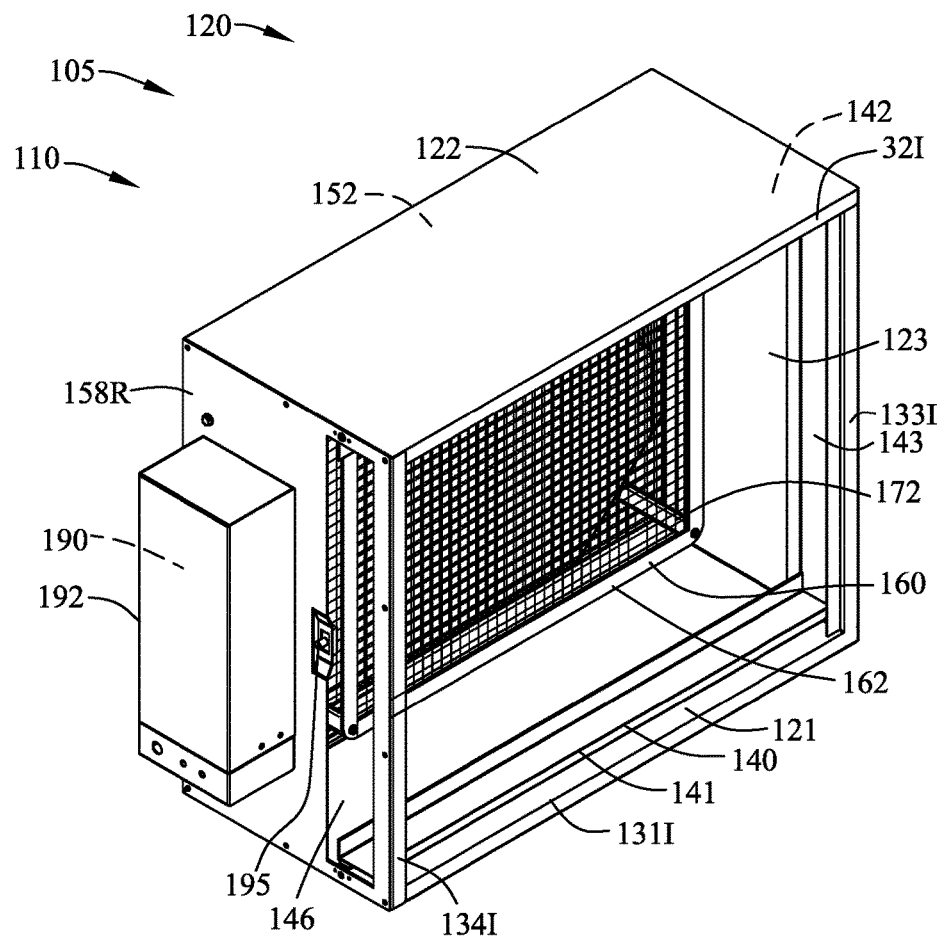
FIG. 19 illustrates the complete installation of the air purifying system of the present invention into the air plenum.

FIG. 19 illustrates the complete installation of the air purifying system 105 of the present invention into the air plenum 110.

Figure 20:
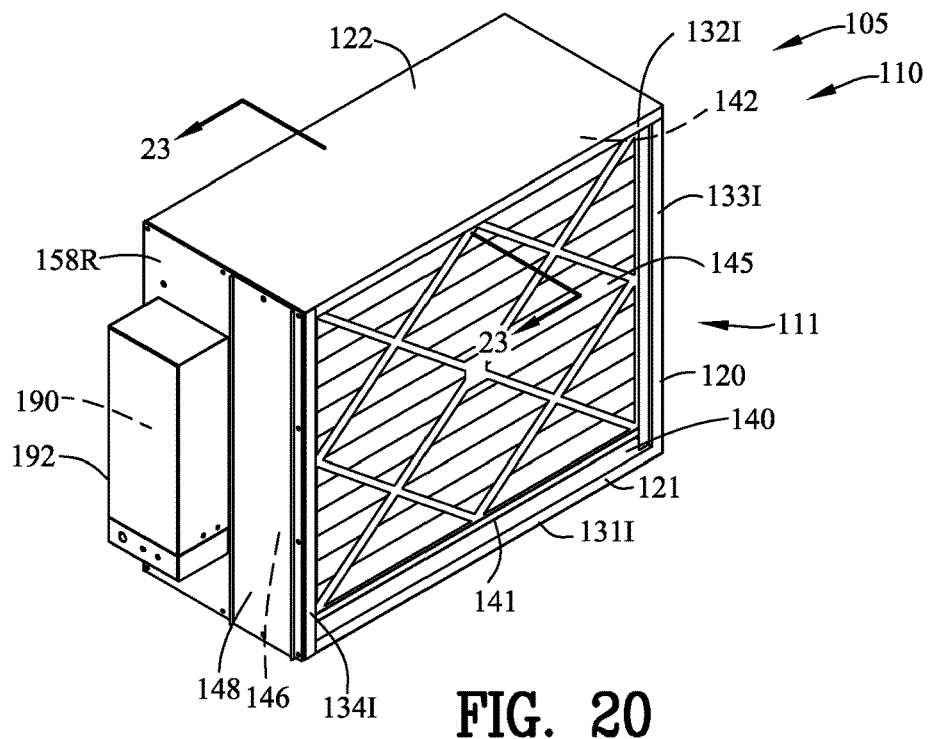
FIG. 20 is an isometric view similar to FIG. 13 illustrating the air purification system incorporating electronic grid generator and the grid array.

FIG. 20 is an isometric view similar to FIG. 13 illustrating the air purification system 105 incorporating electronic generator 190 and the grid array 160.

Figure 14:
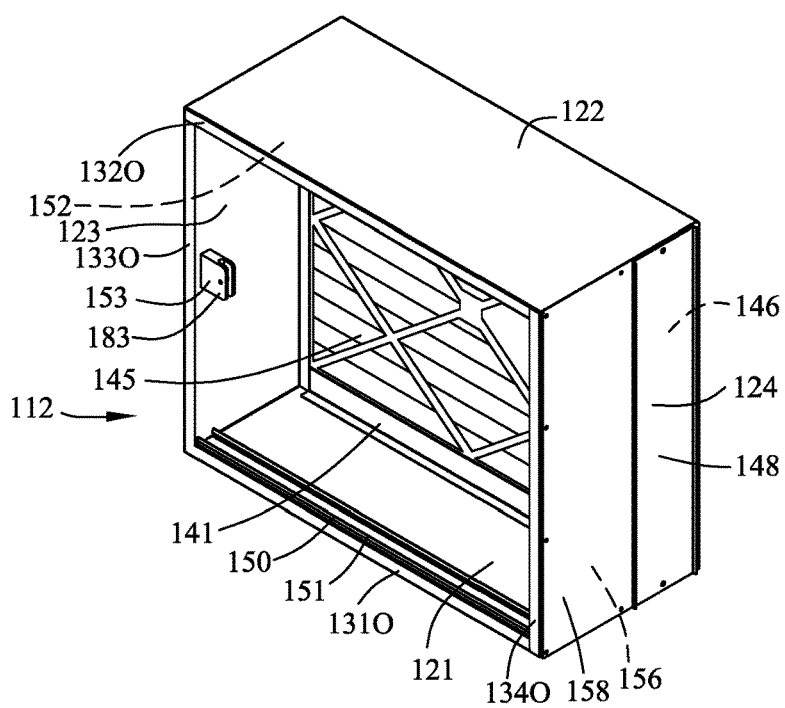
FIG. 14 is an isometric view illustrating an output of the air plenum of FIG. 13.
Figure 15:
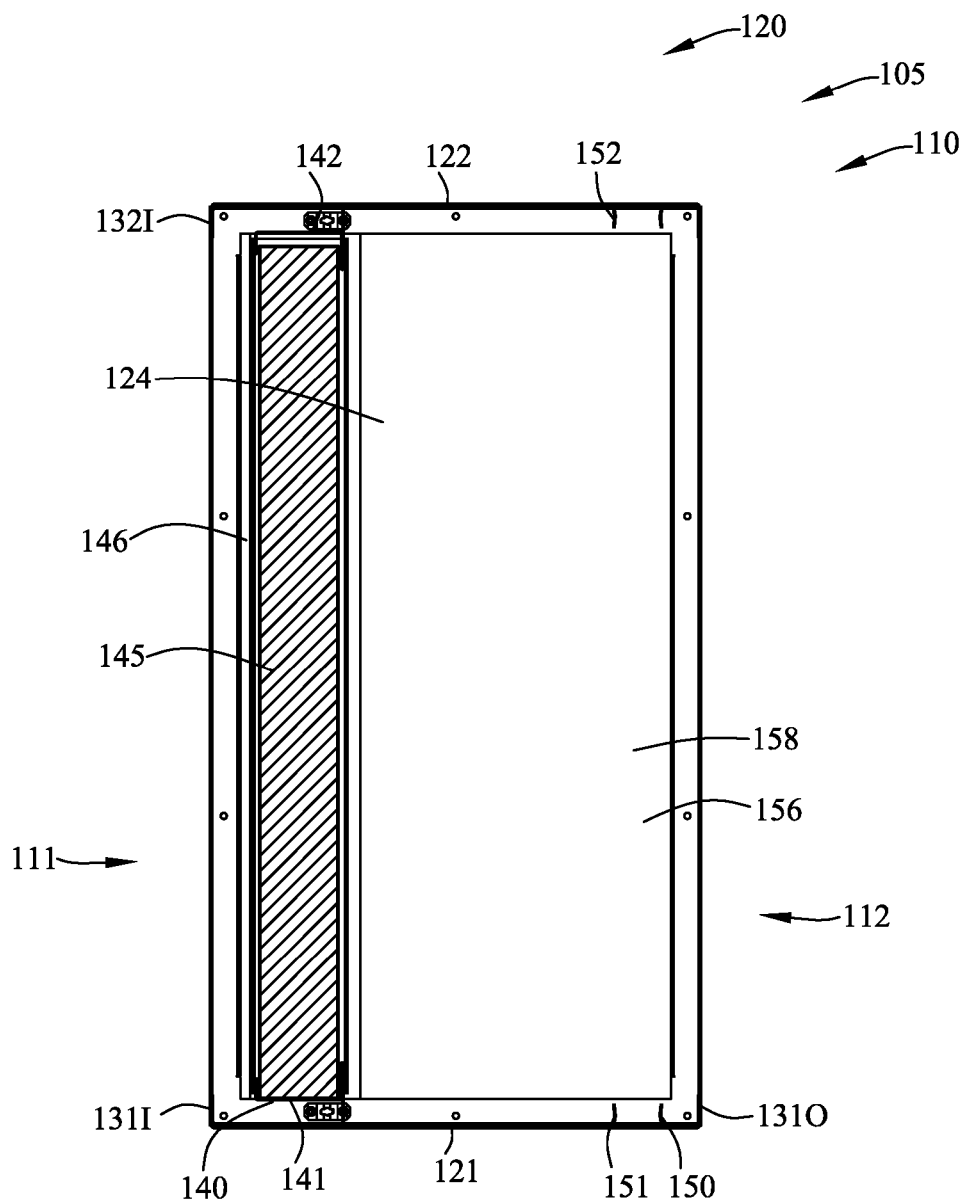
FIG. 15 is a sectional view along a line 15-15 in FIG. 13.
Figure 21:
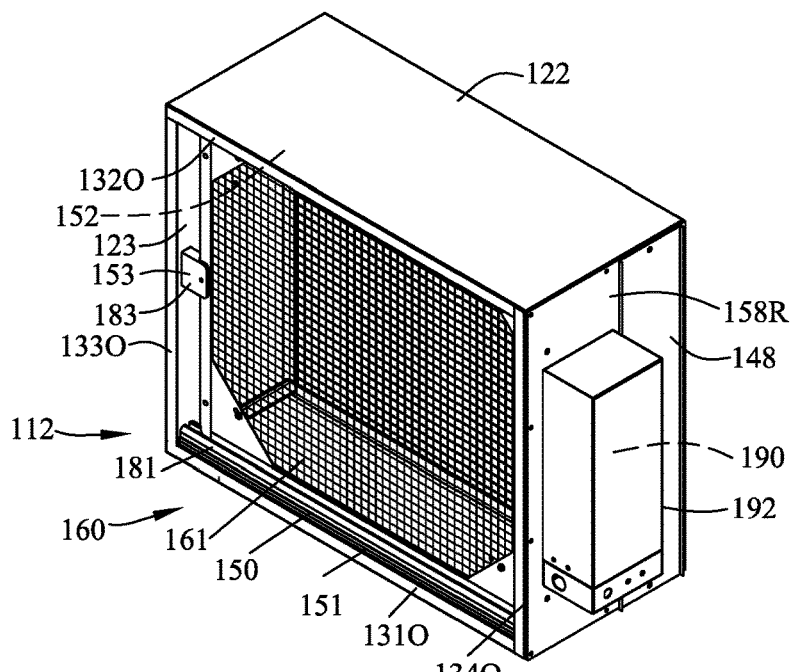
FIG. 21 is an isometric view similar to FIG. 14 illustrating the air purification system incorporating electronic grid generator and the grid array.
Figure 22:
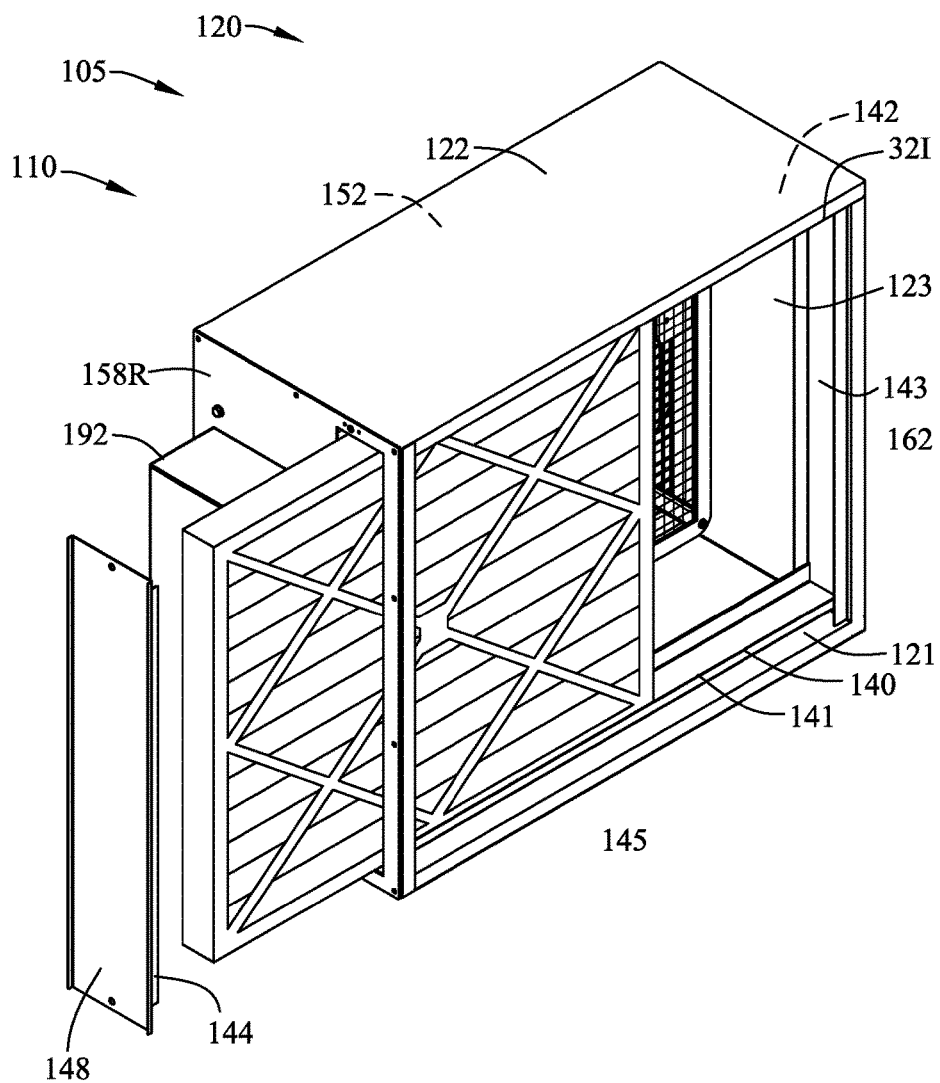
FIG. 22 illustrates the removal of an air filter from the frame of the air purification system of FIG. 20.

FIG. 21 is an isometric view similar to FIG. 14 illustrating the air purification system 105 incorporating electronic generator 190 and the grid array 160;

FIG. 22 illustrates the removal of an air filter 145 from the frame 120 of the air purification system 105 of FIG. 20.

Figure 23:
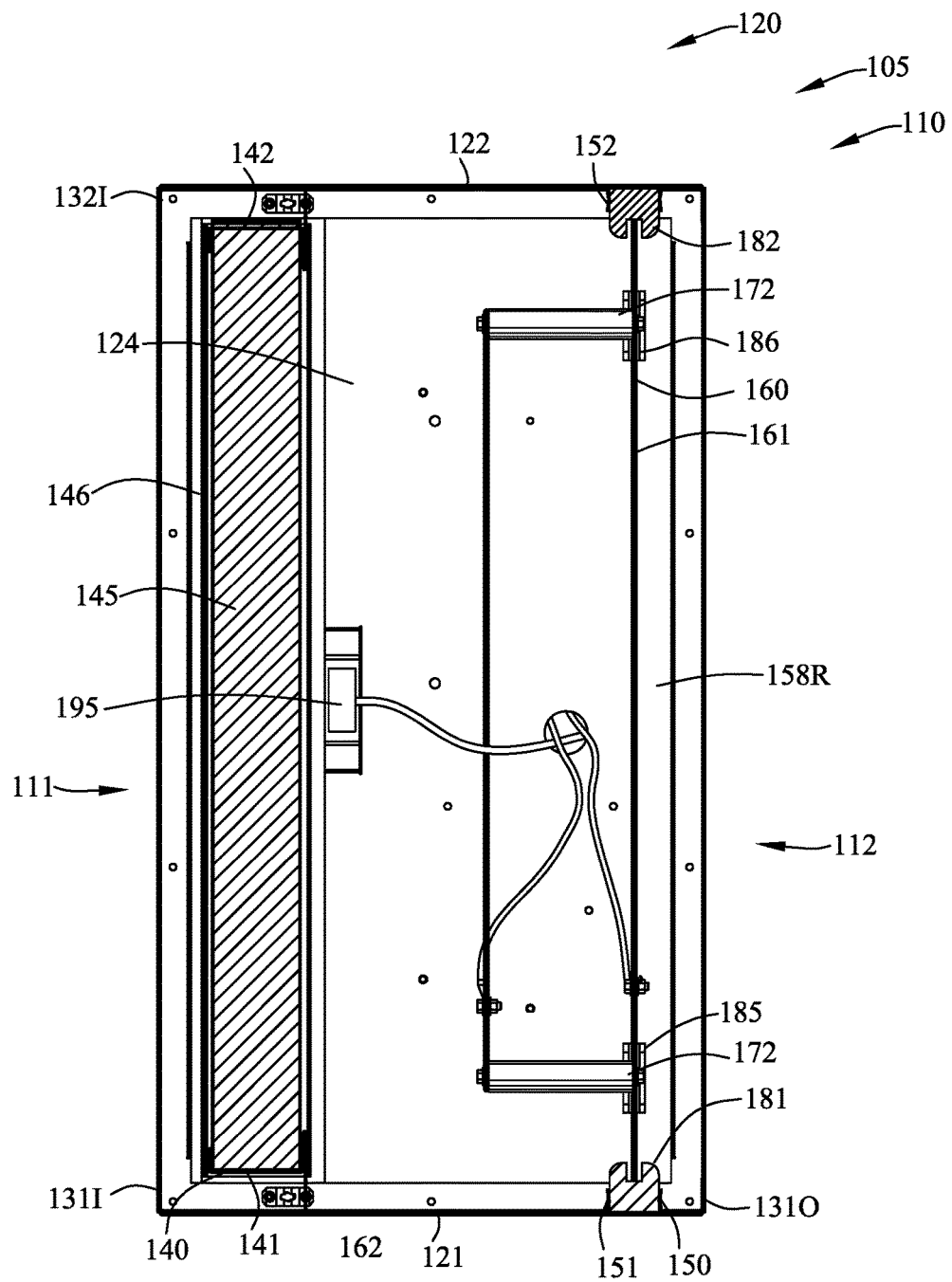
FIG. 23 is a sectional view along a line 23-23 in FIG. 20 illustrating a disconnect switch for disconnecting the electronic grid generator upon opening an air filter access panel.

FIG. 23 is a sectional view along a line 23-23 in FIG. 20 illustrating a disconnect switch 195 for disconnecting the electronic generator 190 upon opening the air filter aperture closure 148.

Figure 24:
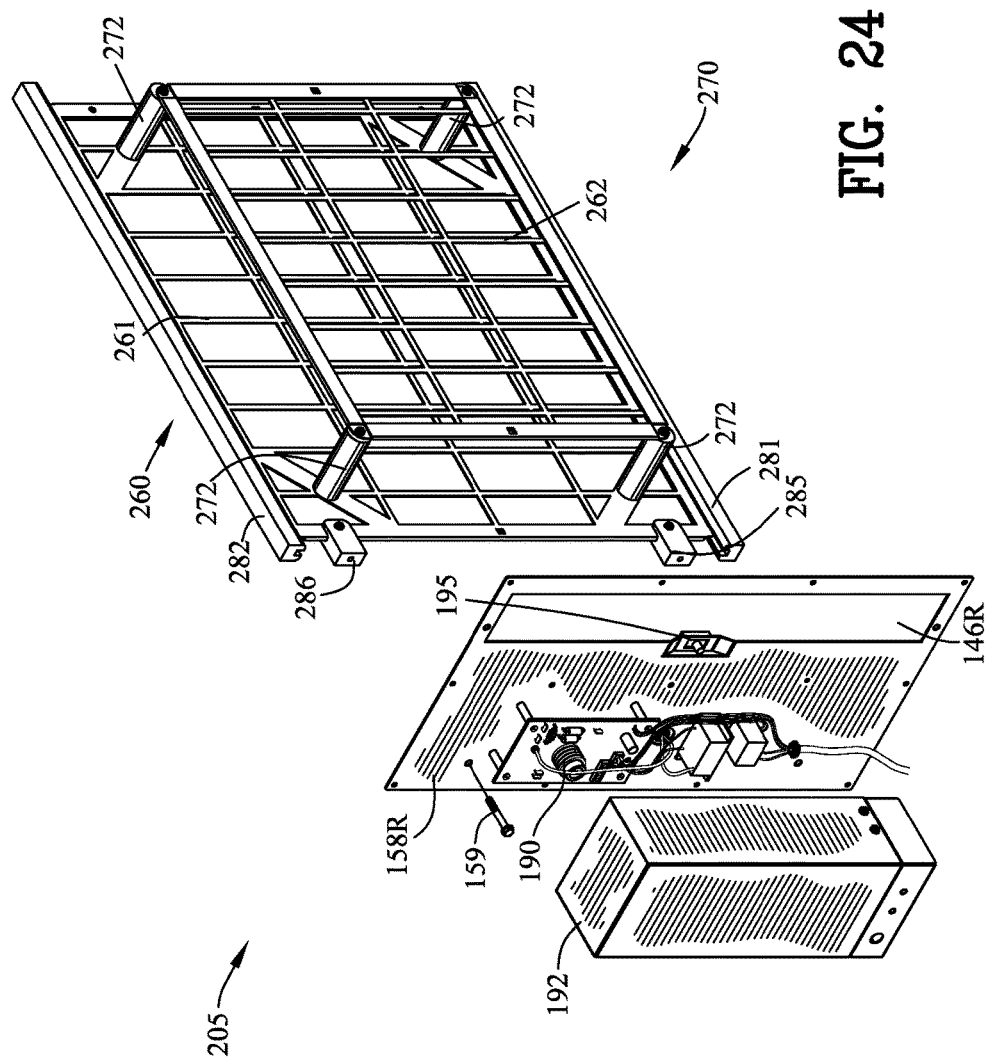
FIG. 24 is an exploded view of the air purifying system incorporating an improved grid array incorporating the present invention.
Figure 25:
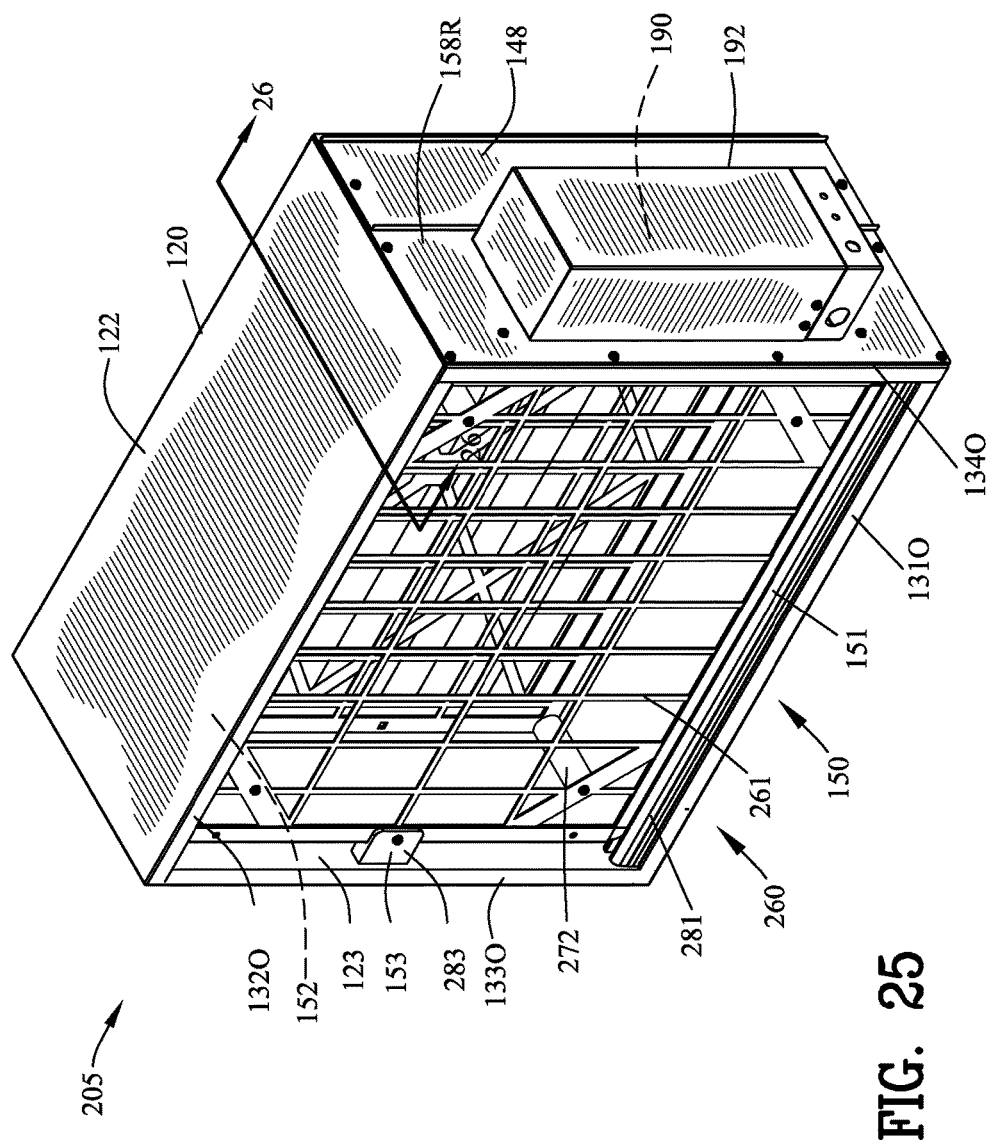
FIG. 25 is an isometric view illustrating the insertion of air purifying system of FIG. 24 into the air plenum of FIGS. 13-16.
Figure 26:
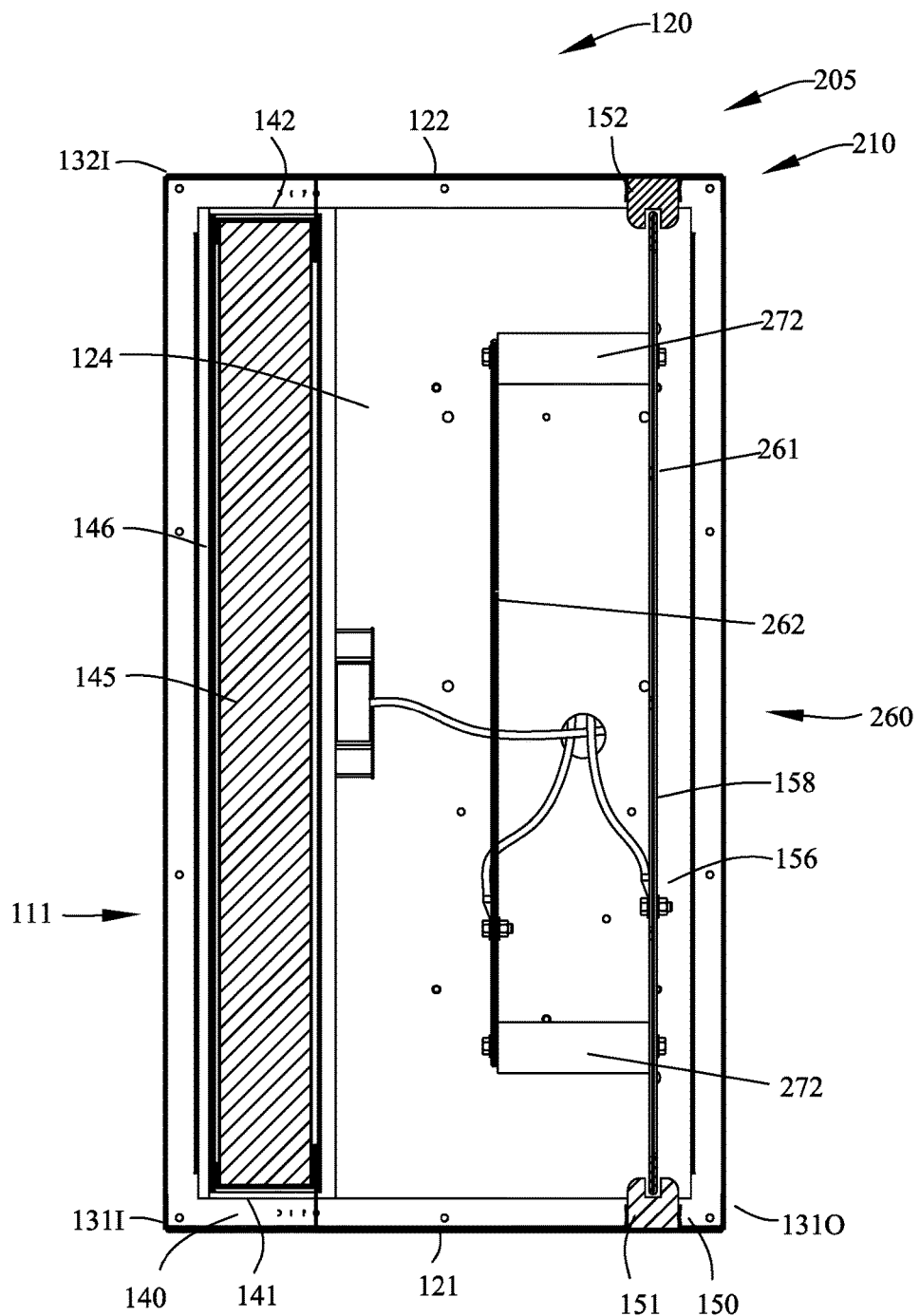
FIG. 26 is a sectional view along a line 26-26 in FIG. 25.
Figures 27, 28:
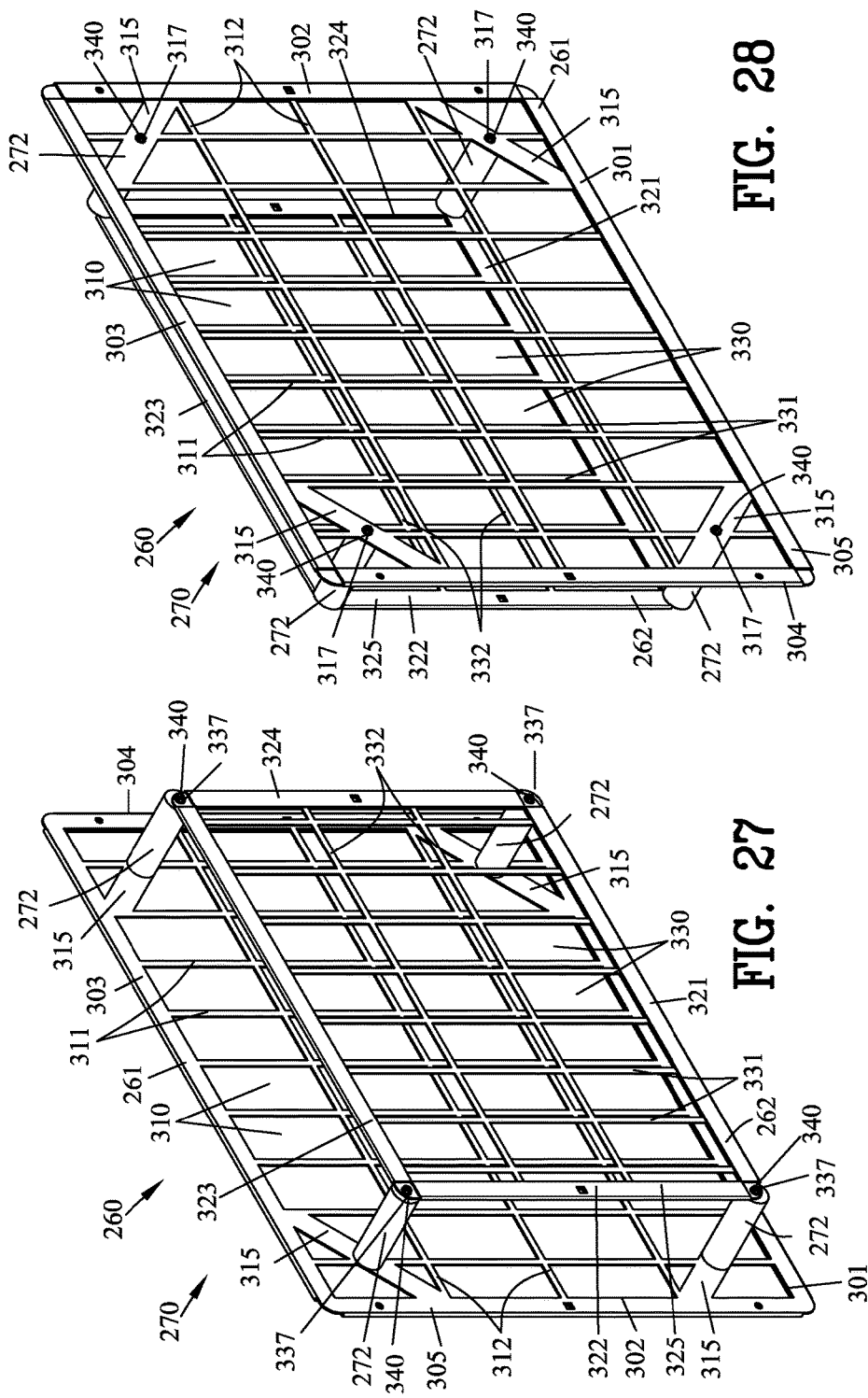
FIG. 27 is an enlarged front isometric view of the improved grid array of FIGS. 24-25.
FIG. 28 is a rear view of the improved grid array of FIG. 27.

FIGS. 24-26 are various views of an air purifying system 205 incorporating an improved grid array 260 incorporating the present invention. The grid array 260 comprises a first grid 261 and a second grid 262. A grid array 260 is secured to an inside side surface of the replacement peripheral wall 158R. The electronic generator 190 is mounted to the outer surface of the replacement peripheral wall 158R and connected to the grid array 260. The improved grid array 260 is compatible with the air purifying system 5 of FIGS. 1-12 as well as the air purifying system 105 of FIGS. 13-23.

Insulators 270 comprise first insulators 271 and second insulators 272. The first insulators 271 insulate the first grids 261 from the frame 120 as heretofore described. The first insulators 271 comprise insulators 281-282 for insulating the first grid 261 from the peripheral walls 121-123. The insulators 281 and 282 are inserted into the first and second grid track 151-153 in a manner set forth previously. The second insulators 272 insulate the second grid 262 from the first grid 261. Insulators 285 and 286 insulate the first grid 261 from replacement peripheral wall 158R. The first grid 261 is dimensionally larger than the second grid 262 for spacing the second grid 262 from the peripheral sidewalls 121-124 of the frame 120.

FIGS. 27-31 are various views of the improved grid array of FIGS. 24-26. The first grid array 261 comprises a one-piece first grid 261 formed from a single sheet of conductive material 263. Preferably, the single sheet of conductive material 263 is a single sheet of a conductive metallic material such as steel, aluminum or the like. The single sheet of the conductive material 263 extends between terminal ends 301-304.

The second grid array 262 comprises a one-piece second grid formed from a single sheet of conductive material 264. Preferably, the single sheet of conductive material 264 is a single sheet of a conductive metallic material such as steel, aluminum or the like. The single sheet of the conductive material 264 extends between terminal ends 321-324.

Figure 32:
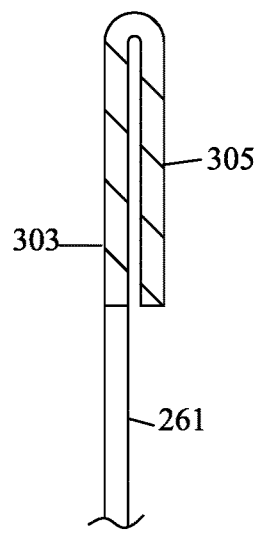
FIG. 32 is a magnified sectional view along a line 32-32 in FIG. 30.
Figure 33:
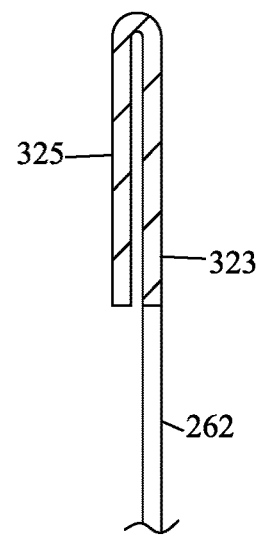
FIG. 33 is a magnified sectional view along a line 33-33 in FIG. 30.
Figure 34:
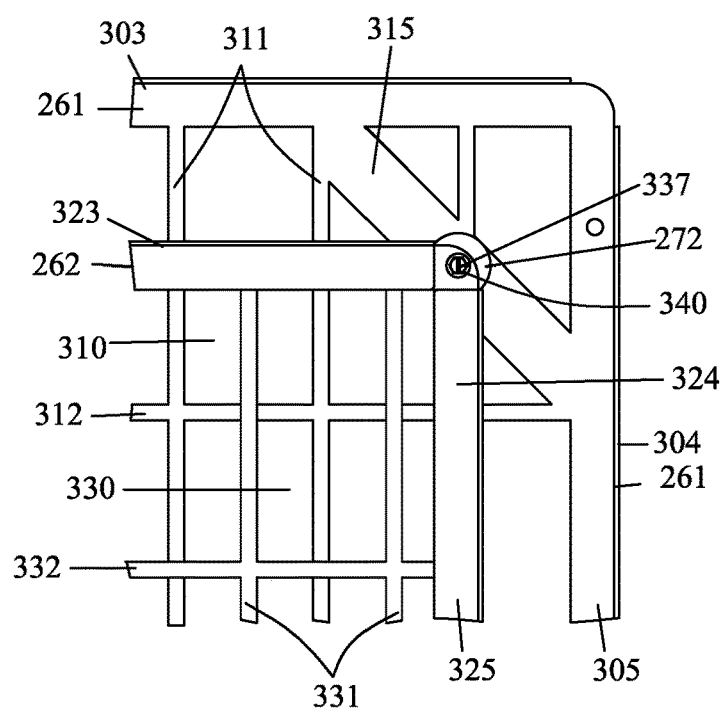
FIG. 34 is a magnified view of a portion of FIG. 29.
Figure 35:
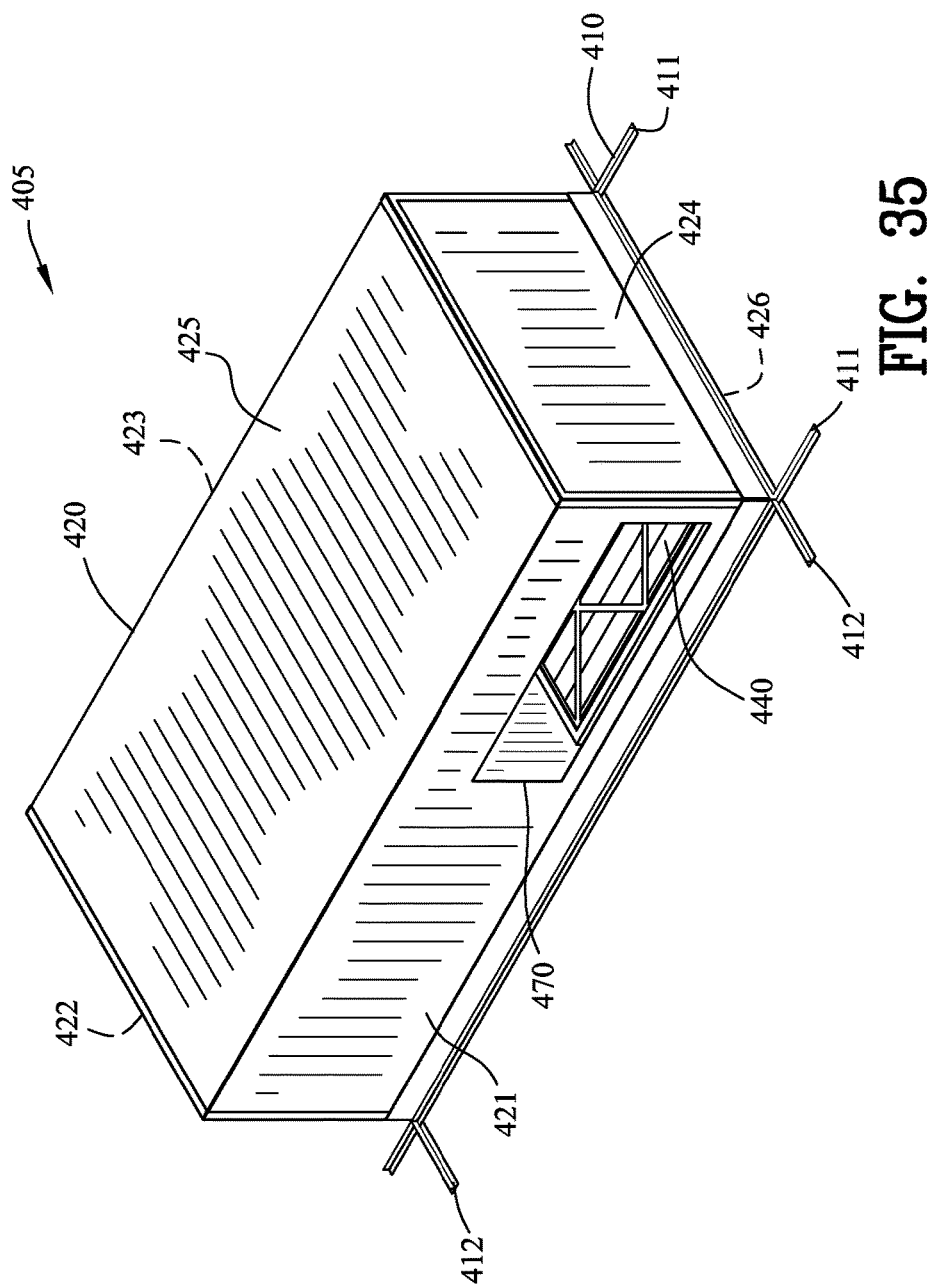
FIG. 35 is an isometric view of a third embodiment of the present invention illustrating an improved ceiling mounted air treatment system installed on a ceiling grid system.
Figure 36:
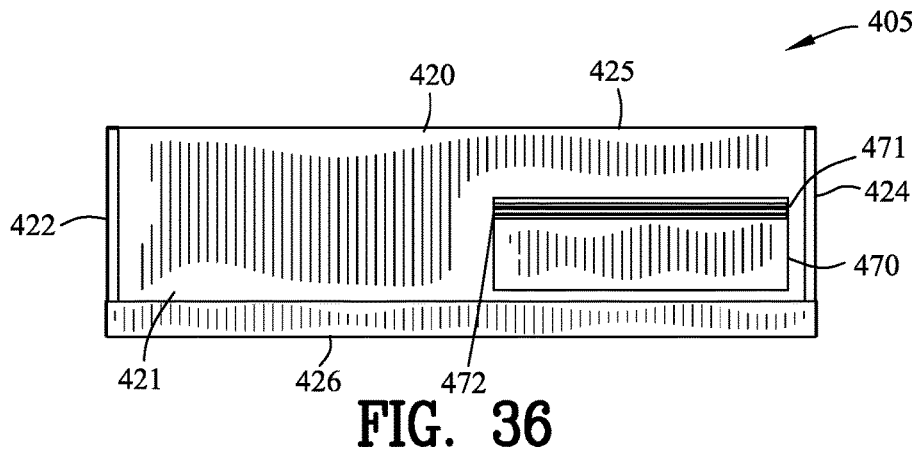
FIG. 36 is a side view of the improved ceiling mounted air treatment system of FIG. 35.
Figure 37:
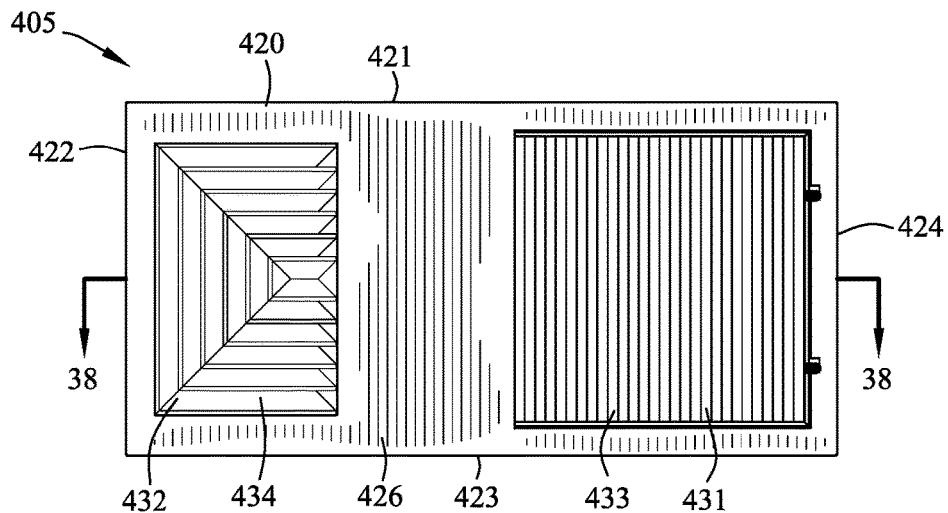
FIG. 37 is a bottom view of FIG. 36.
Figure 38:
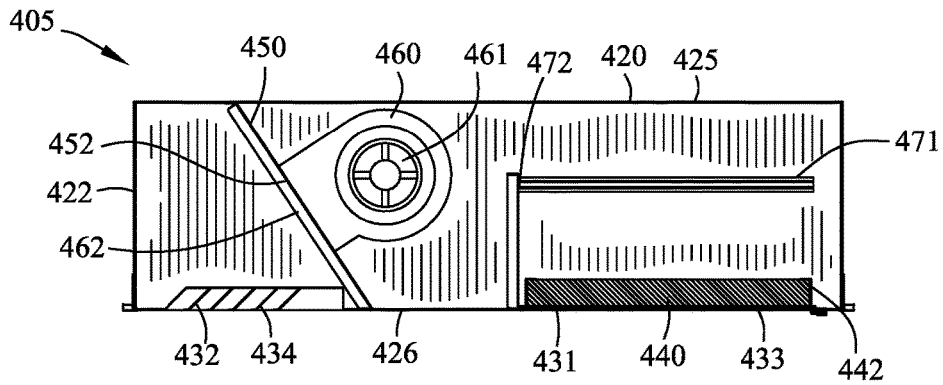
FIG. 38 is a sectional view along the line 38-38 in FIG. 37.
Figure 39:
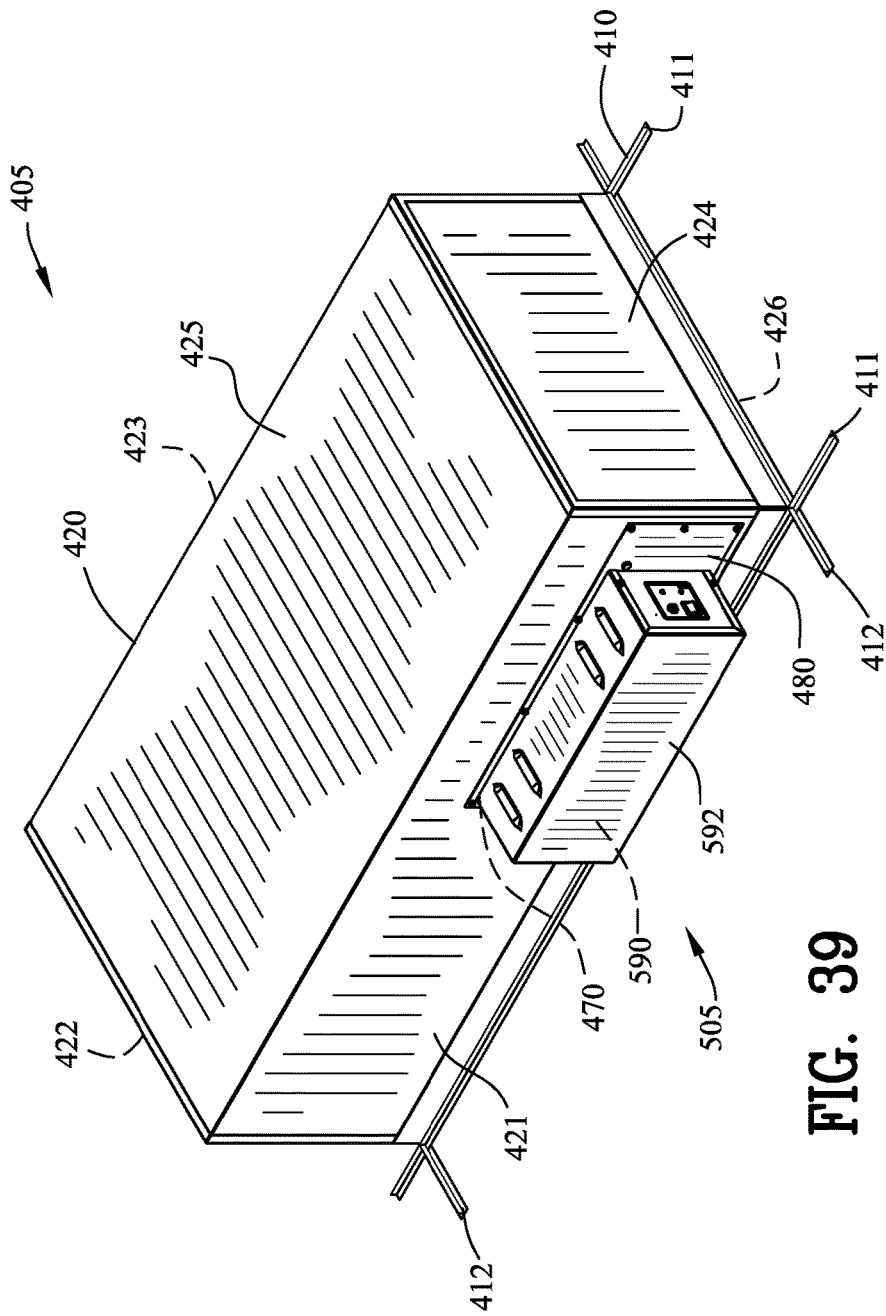
FIG. 39 is an isometric view similar to FIG. 35 illustrating a grid array and an electronic generator positioned within the improved ceiling mounted air treatment system.
Figure 40:
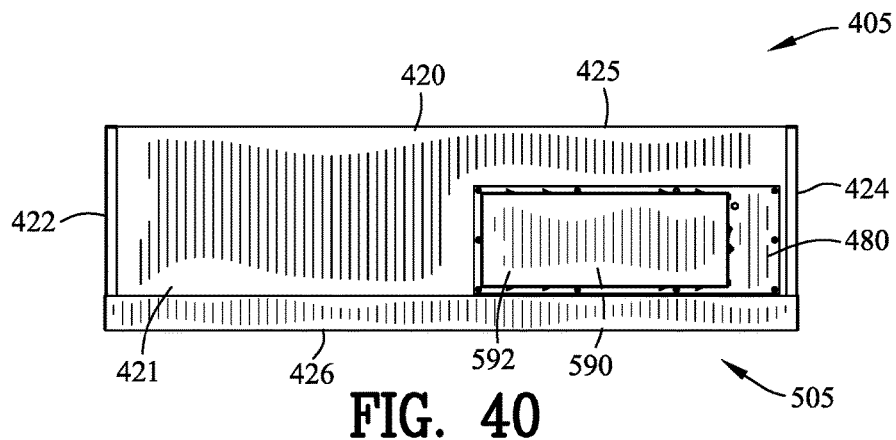
FIG. 40 is a side view of FIG. 39.
Figure 41:
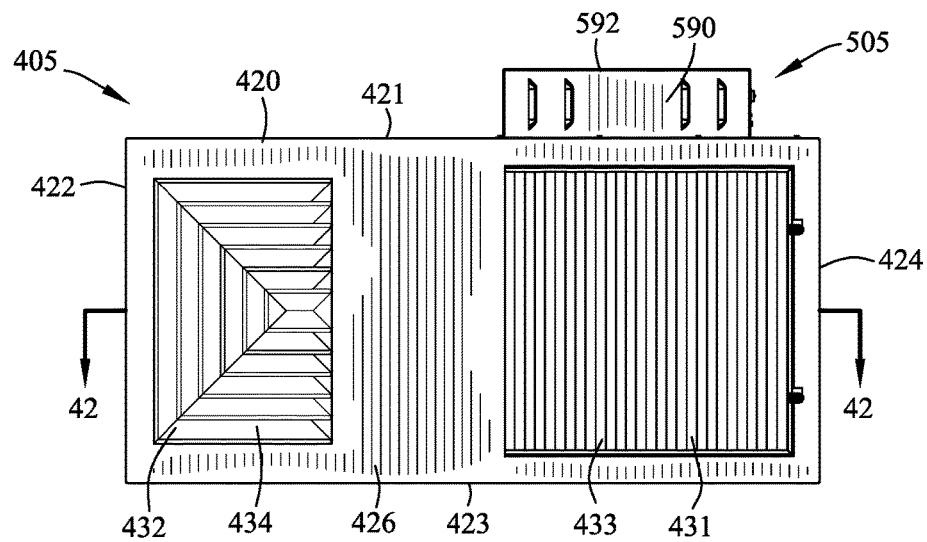
FIG. 41 is a bottom view of FIG. 40.
Figure 42:
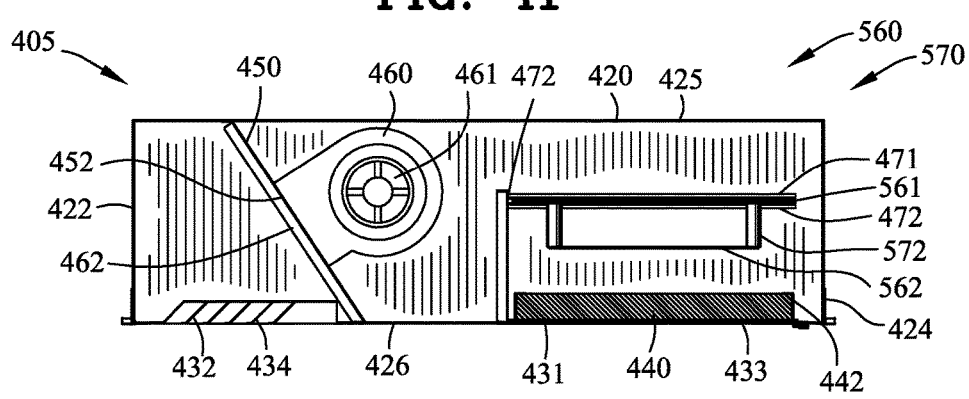
FIG. 42 is a sectional view along the line 42-42 in FIG. 41.
Figure 43:
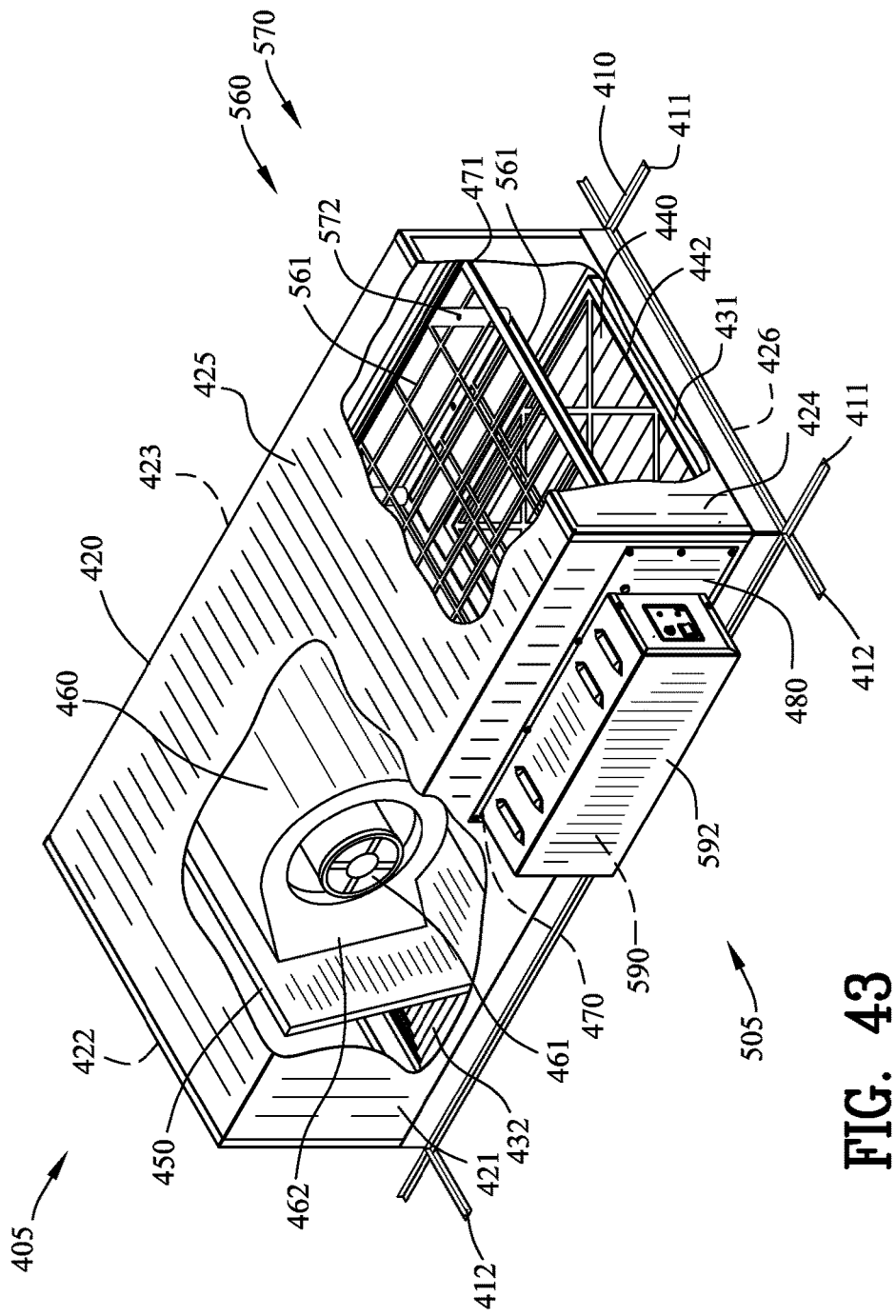
FIG. 43 is a partially cut away isometric view of FIG. 39.
Figure 44:
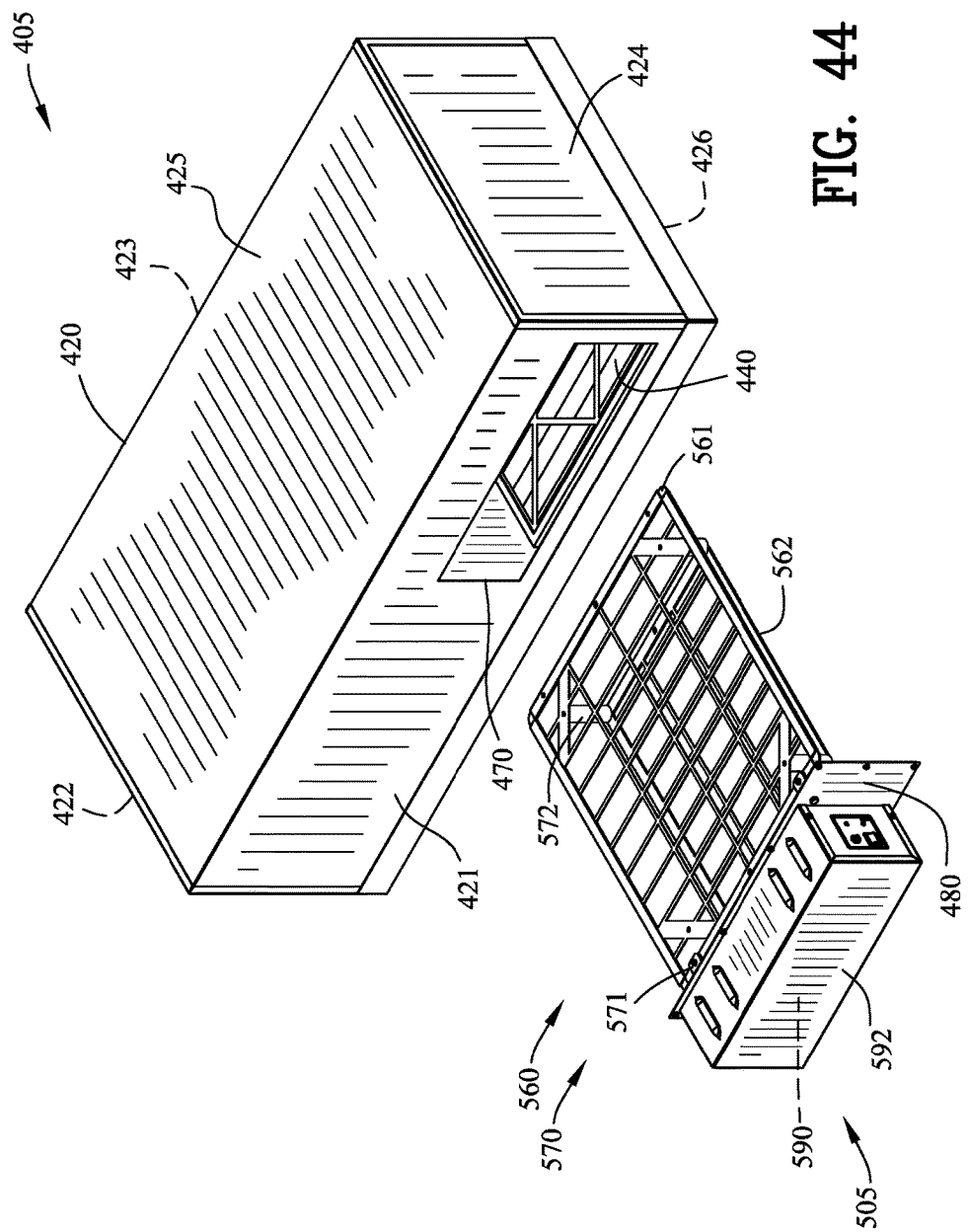
FIG. 44 is an isometric view similar to FIG. 43 illustrating a grid array and an electronic generator removed from the improved ceiling mounted air treatment system.

FIGS. 32 and 33 are magnified views of portions of FIG. 30 illustrating the first and second grids 261 and 262. The terminal ends 301-304 of the conductive material 263 of the first grid 261 form a peripheral frame 305 extending about periphery of the first grid 261. In a similar manner, the terminal ends 321-324 of the conductive material 264 form a peripheral frame 325 extending about periphery of the one-piece second grid 262.

In this example, the peripheral frame 305 of the first grid 261 is formed by bending a portion of each of the terminal ends 301-304 one hundred and eighty degrees (180°) about a radius. Similar, the peripheral frame 325 of the first grid 262 is formed by bending a portion of each of the terminal ends 321-324 one hundred and eighty degrees (180°) about a radius. Although the peripheral frames 305 and 325 have been shown as bends in the terminal ends of the first and second grids 261 and 262, it should be understood that numerous other means may be employed to form the peripheral frames 305 and 325.

Referring back to FIGS. 27-31, a plurality of first apertures 310 are formed in the one piece first grid 261 defining a multiplicity of first grid elements 311 and a multiplicity of first transverse grid elements 312. In the example, the majority of the plurality of first apertures are quadrilateral and more specifically regular quadrilateral or rectangular. The regular quadrilateral first apertures establish the first transverse grid elements 311 to extend perpendicular to the first grid elements 312.

A minority of the first apertures 310 are triangular for defining a plurality of first mounting braces 315 integrally formed in the one-piece first grid 261. In addition, a minority of the first apertures 310 defining a plurality of circular holes 317 in the first mounting braces 315 for mounting the second insulators 272. Although the plurality of first apertures 310 have been shown to be quadrilateral, triangular or circular, it should be understood that the first apertures 310 may be any other suitable shape.

In a similar manner, a plurality of second apertures 330 are formed in the second one piece grid 262 defining a multiplicity of second grid elements 331 and a multiplicity of second transverse grid elements 332. The majority of the plurality of second apertures 330 are quadrilateral and more specifically regular quadrilateral or rectangular. The regular quadrilateral second apertures 330 establish the second transverse grid elements 332 to extend perpendicular to the second grid elements 331. A minority of apertures 330 are circular holes 337 in the second grid 262 for mounting the second insulators 272. Although the plurality of second apertures 330 have been shown to be quadrilateral or circular, it should be understood that the apertures may be any other suitable shape.

The second insulators 272 secure the second grid 262 to the first grid 261 by a plurality of fasteners 340 extending through the holes 317 defined in the braces 315 and the holes 337 defined in the second grid 262.

The second grid elements 331 and second transverse grid elements 332 of the second grid 262 are offset relative to the multiplicity of first grid elements 311 and first transverse grid elements 332 of the first grid 261. Preferably, the intersection second grid elements 331 and second transverse grid elements 332 of the second grid 262 are centered within the first apertures 310 of the first grid 261 as best shown in FIG. 29.

Each of the multiplicity of first grid elements 311 and the multiplicity of first transverse grid elements 312 have a width less than forty percent of a width of the first peripheral frame 305. Each of the multiplicity of first grid elements 311 and the multiplicity of first transverse grid elements 312 have the same thickness.

The first peripheral frame 305 has a thickness equal to or greater than the thickness of the first grid elements 311 and the first transverse grid elements 312. In the example shown in FIG. 32, the peripheral frame 305 has a thickness equal to or greater than twice the thickness of the first grid elements 311 or the thickness of first transverse grid elements 312.

Each of the second grid elements 331 and the second transverse grid elements 332 have a width less that forty percent the width of the second peripheral frame 325. Each of the second grid elements 331 and the second transverse grid elements 332 have the same thickness.

The second peripheral frame 325 has a thickness equal to or greater than the thickness of the second grid elements 331 and the second transverse grid elements 332. In the example shown in FIG. 33, the peripheral frame 325 has a thickness equal to or greater than twice the thickness of the second grid elements 331 or the thickness of the second transverse grid elements 332.

The invention is incorporated into the method of making a one-piece grid. The method comprises providing a one-piece sheet of a conductive material. A plurality of apertures are cut into the one-piece of conductive material to form a multiplicity of grid elements and a multiplicity of intersecting transverse grid elements. The grids may be cut from a single sheet of conductive material in various ways including stamping, molding, water jet cutting or laser cutting. The step of cutting a single sheet of conductive material may form braces in the grid for supporting the grid. A peripheral frame may be formed bending terminal ends of the one-piece grid.

FIGS. 35-40 illustrate a portion of an improved ceiling mounted air treatment system 405 representing a third embodiment of the present invention. The ceiling mounted air treatment system 405 is designed to be installed upon a conventional ceiling grid system 410. The ceiling grid system 410 comprises a plurality of longitudinal grid beams 411 and a plurality of transverse grid beams 412 for supporting a plurality of ceiling panels (not shown) as should be well known to those skilled in the art.

The improved ceiling mounted air treatment system 405 comprises a ceiling plenum 420 having a frame formed by peripheral walls 421-424, a top wall 425 and a bottom wall 426. The plurality of side walls 421-424 are dimensioned for being supported by plural longitudinal grid beams 411 and plural transverse grid beams 412 thereby replacing a ceiling panel (not shown) of the ceiling grid system 410.

A ceiling air input 431 and a ceiling air output 432 are defined in the bottom wall 426. At least one of the air input 431 and the air output 432 is adapted to receive a removable air filter 440. In this embodiment, an air filter seat 442 located in the ceiling plenum 420 adjacent to the air input 431. An input grill 433 is removably mounted to the ceiling plenum 420 adjacent to the air input 431 for introducing and removing the air filter 440 into the ceiling plenum 420.

A baffle 450 is disposed within the ceiling plenum 420 for isolating or separating the ceiling air input 431 and a ceiling air output 432 within the ceiling plenum 420. A baffle orifice 452 is disposed within the baffle 450 for permitting air flow from the ceiling air input 431 to the ceiling air output 432.

A fan 460 is mounted to the baffle 450 for communication with the baffle orifice 452. The fan 460 is powered by a conventional electric motor (not shown). The fan 460 includes a fan input 461 and a fan output 462 for moving air from the ceiling air input 431 to the ceiling air output 432. Preferably, the baffle 450 is mounted at an angle within the ceiling plenum 420 for directing air from the fan output 462 toward the ceiling air output 432 of the ceiling plenum 420.

A grid array aperture 470 is defined in the ceiling plenum 420. Preferably, the grid array aperture 470 is defined in the peripheral wall 421 or sidewall of the ceiling plenum 420. A first and a second grid track 471 and 472 are located adjacent to the grid array aperture 470.

FIGS. 39-44 illustrate the improved ceiling mounted air treatment system 405 of FIGS. 35-38 with an air purification system 505 slidably received within the ceiling plenum 420. In this embodiment, the air purification system 505 is similar to the air purification system 205 shown in FIG. 24. Although the air purification system 505 has been shown to be similar to the air purification system 205 shown in FIG. 24, it should be understood that other types of air purification systems may be used with the ceiling plenum 420 of the present invention.

The air purification system 505 comprises a grid array 560 for mounting the purification system 505 within the ceiling plenum 420 adjacent to the removable air filter 440 and the air input 431. The grid array 560 comprises a first grid 561 and a second grid 562. A grid array 560 is secured to an inside side surface of grid aperture closure 480. An electronic generator 590 is mounted to the outer surface of the of grid aperture closure 480 and connected to the grid array 560.

The first grid 561 is slidably received between the first and second grid tracks 471 and 472 in the ceiling plenum 420. Insulators 570 comprise a first insulator 571 and a second insulator 572. The first insulator 571 insulates the first grid 561 from the first and a second grid tracks 471 and 472. The first insulator 571 may be incorporated into the first and second grid tracks 471 and 472 or may be separate insulators. The second insulator 572 insulates the second grid 562 from the first grid 561.

The grid aperture closure 480 seals the grid aperture 470 when the first grid 561 is slidably received between the first and second grid tracks 471 and 472 in the ceiling plenum 420. The electronic generator 590 is mounted to the outer surface of the of grid aperture closure 480 and covered by a generator cover 592.

The fan 460 establishes the flow of air from the room into the ceiling air input 431 to exit from the ceiling air output 432 into the room. The electronic generator 590 is connected to the grid array 560 for treating the flow of air through the grid array 560. The electronic generator 590 and the grid array 560 generates electric fields for agglomerating particles within air passing from the ceiling air input 431 to the ceiling air output 432. The fan being 460 directs air flow from the electronic generator 590 and grid array 560 to exit from the ceiling air output 432.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved ceiling mounted air treatment system for installation upon a ceiling grid system having a plurality of ceiling panels within a room, comprising:
    a ceiling plenum defining a plurality of side walls, a top wall and a bottom wall;
    said plurality of side walls dimensioned for replacing a ceiling panel of the ceiling grid system;
    an air input and an air output defined in said bottom wall;
    a grid array disposed within said plenum and located between said air input and said air output;
    an electronic generator connected to said grid array for treating the flow of air through said grid array; and
    a fan interposed between said air input and said air output for establishing the flow of air from the room into said air input to exit from said air output into the room.

2. An improved air treatment system as set forth in claim 1, wherein at least one of said air input and said air output defined in said bottom wall includes a removable air filter.

3. An improved air treatment system as set forth in claim 1, wherein said grid array is located adjacent to said air input of said plenum.

4. An improved air treatment system as set forth in claim 1, wherein said fan is located adjacent to said air output of said plenum.

5. An improved air treatment system as set forth in claim 1, including a removable input grill for introducing and removing an air filter into said ceiling plenum.

6. An improved air treatment system as set forth in claim 1, including an air filter seat located in said ceiling plenum adjacent to said air input; and
    an input grill removably mounted to said ceiling plenum adjacent to said air input for introducing and removing an air filter into said ceiling plenum.

7. An improved air treatment system as set forth in claim 1, including a grid array aperture defined in said plenum for removably receiving said grid array.

8. An improved air treatment system as set forth in claim 1, including a grid array aperture defined in a sidewall of said plenum for removably receiving said grid array.

9. An improved air treatment system as set forth in claim 1, including a grid array aperture defined in said plenum; and
    a grid track located adjacent to said grid array aperture for slidably receiving said grid array within said ceiling plenum.

10. An improved air treatment system as set forth in claim 1, including a grid array aperture defined in a side wall of said ceiling plenum adjacent to said grid array track;
    a grid array closure securing to said grid array for removably covering said grid array aperture when said grid array is slideably inserted into said grid track of said ceiling plenum; and
    said electronic generator mounted to an outer surface of said grid closure and connected to said grid array for generating electric fields for agglomerating particles within air passing from said air input to said air output.

11. An improved air treatment system as set forth in claim 1, wherein said grid array comprises a first and a second grid;
a first insulator for insulating said first grid from said ceiling plenum; and
a second insulator for insulating said second grid relative from said first grid.

12. An improved air treatment system as set forth in claim 1, including a baffle disposed within said plenum for directing air flow from said fan to said electronic generator and grid array.

13. An improved air treatment system as set forth in claim 1, including a baffle disposed within said plenum for isolating said air input from said air output;
a baffle orifice defined in said baffle; and
said fan being located in said baffle orifice for directing air flow from said fan from said electronic generator and grid array to exit said air output.

14. An improved air treatment system as set forth in claim 1, wherein said electronic generator and said grid array generates electric fields for agglomerating particles within air passing from said air input to said air output.

15. An improved ceiling mounted air treatment system for installation upon a ceiling grid system having a plurality of ceiling panels within a room, comprising:
a ceiling plenum defining a plurality of side walls, a top wall and a bottom wall;
said plurality of side walls dimensioned for replacing a ceiling panel of the ceiling grid system;
an air input and an air output defined in the said bottom wall;
a baffle disposed within said plenum for isolating said air input from said air output;
a baffle orifice defined in said baffle;
a grid array disposed within said plenum and located adjacent to said air input;
an electronic generator connected to said grid array for treating the flow of air through said grid array; and
a fan located in said baffle orifice for establishing the flow of air from the room into said air input to exit from said air output into the room.

16. An improved air treatment system as set forth in claim 15, including an air filter seat located in said ceiling plenum adjacent to said air input; and
an input grill removably mounted to said ceiling plenum adjacent to said air input for introducing and removing an air filter into said ceiling plenum.

17. An improved air treatment system as set forth in claim 15, including a grid array aperture aperture defined in said plenum; and
a grid track located adjacent to said grid array aperture for slidably receiving said grid array within said ceiling plenum.

18. An improved air treatment system as set forth in claim 15, including a grid array aperture defined in a side wall of said ceiling plenum adjacent to said grid array track;
a grid array closure secured to said grid array for removably covering said grid array aperture when said grid array is slideably inserted into said grid track of said ceiling plenum; and
said electronic generator mounted to an outer surface of said grid closure and connected to said grid array for generating electric fields for agglomerating particles within air passing from said air input to said air output.

19. An improved air treatment system as set forth in claim 15, wherein said grid array comprises a first and a second grid;
a first insulator for insulating said first grid from said ceiling plenum; and
a second insulator for insulating said second grid relative from said first grid.

* * * * *